Nov. 3, 1959

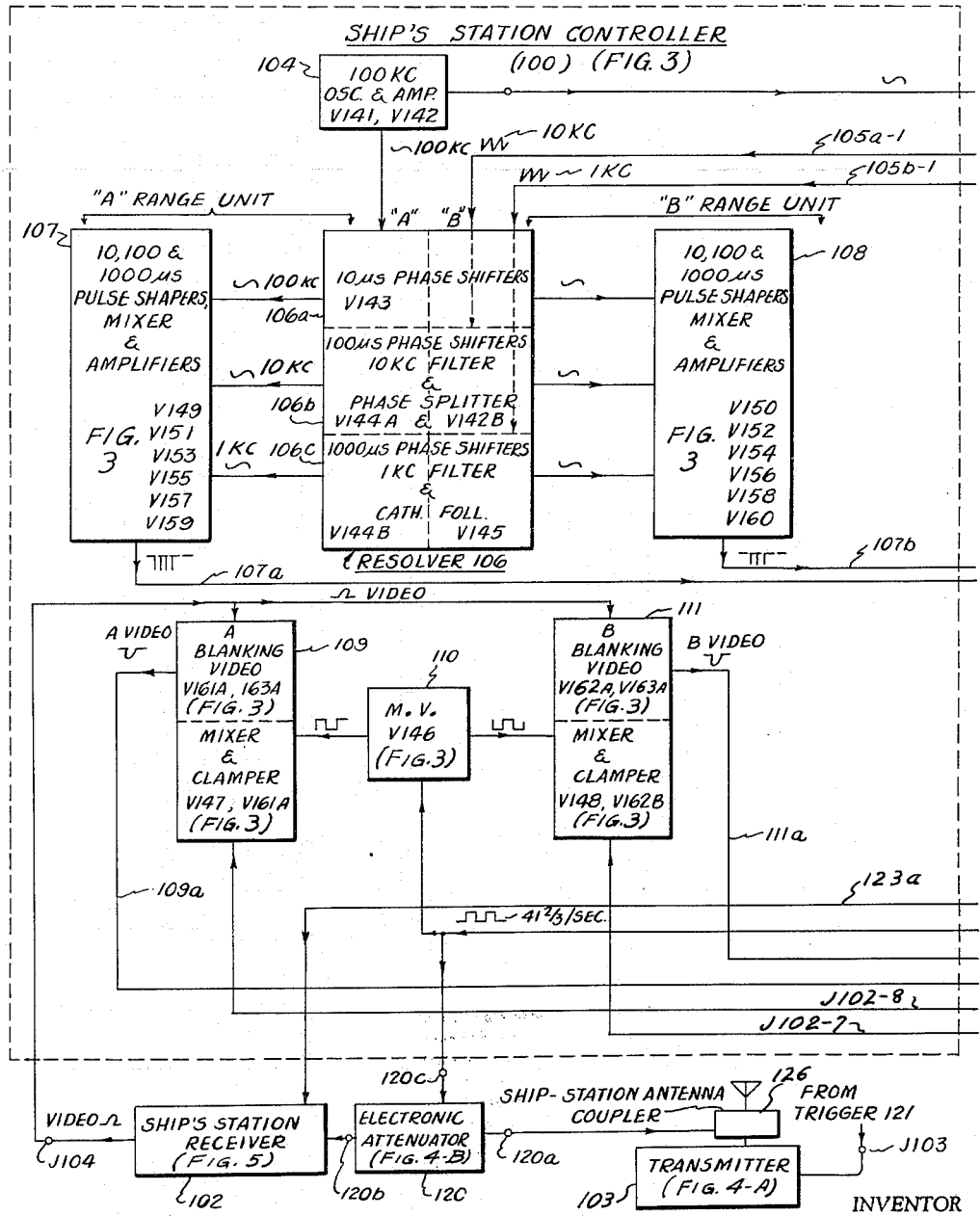
Fig. 1A
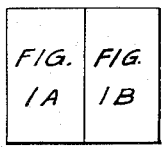

T. J. HICKLEY ET AL 2,911,642

ELECTRONIC POSITION INDICATOR

Filed Dec. 19, 1955

INVENTOR
Thomas J. Hickley
Clarence A. Burmister
Richard R. Ross
BY Arthur Vinograd ATTORNEY
Leonard F. Stoll AGENT

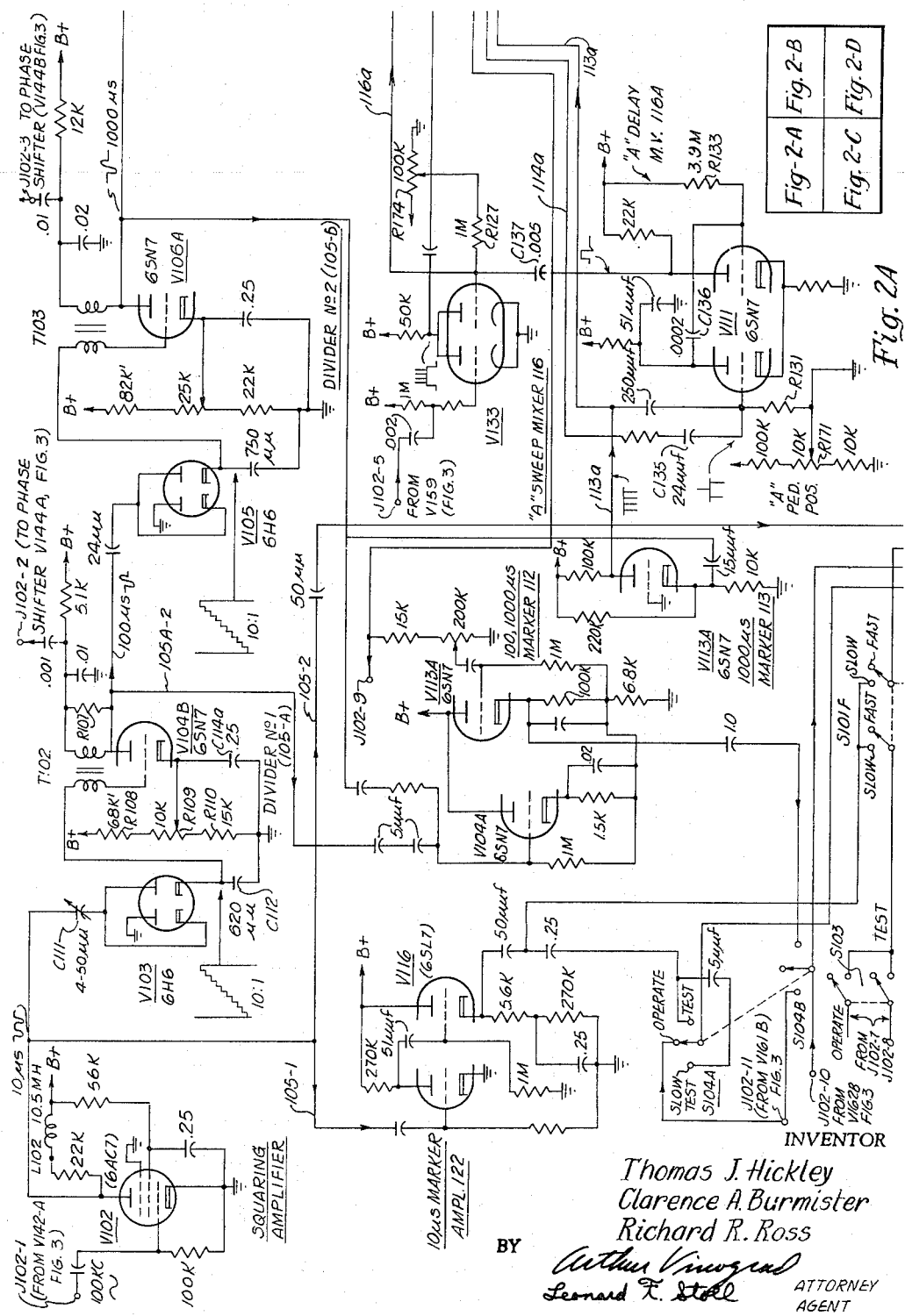

INVENTOR
Thomas J. Hickley
Clarence A. Burmister
Richard R. Ross
BY Arthur Vinograd
Leonard F. Stoll
ATTORNEY
AGENT

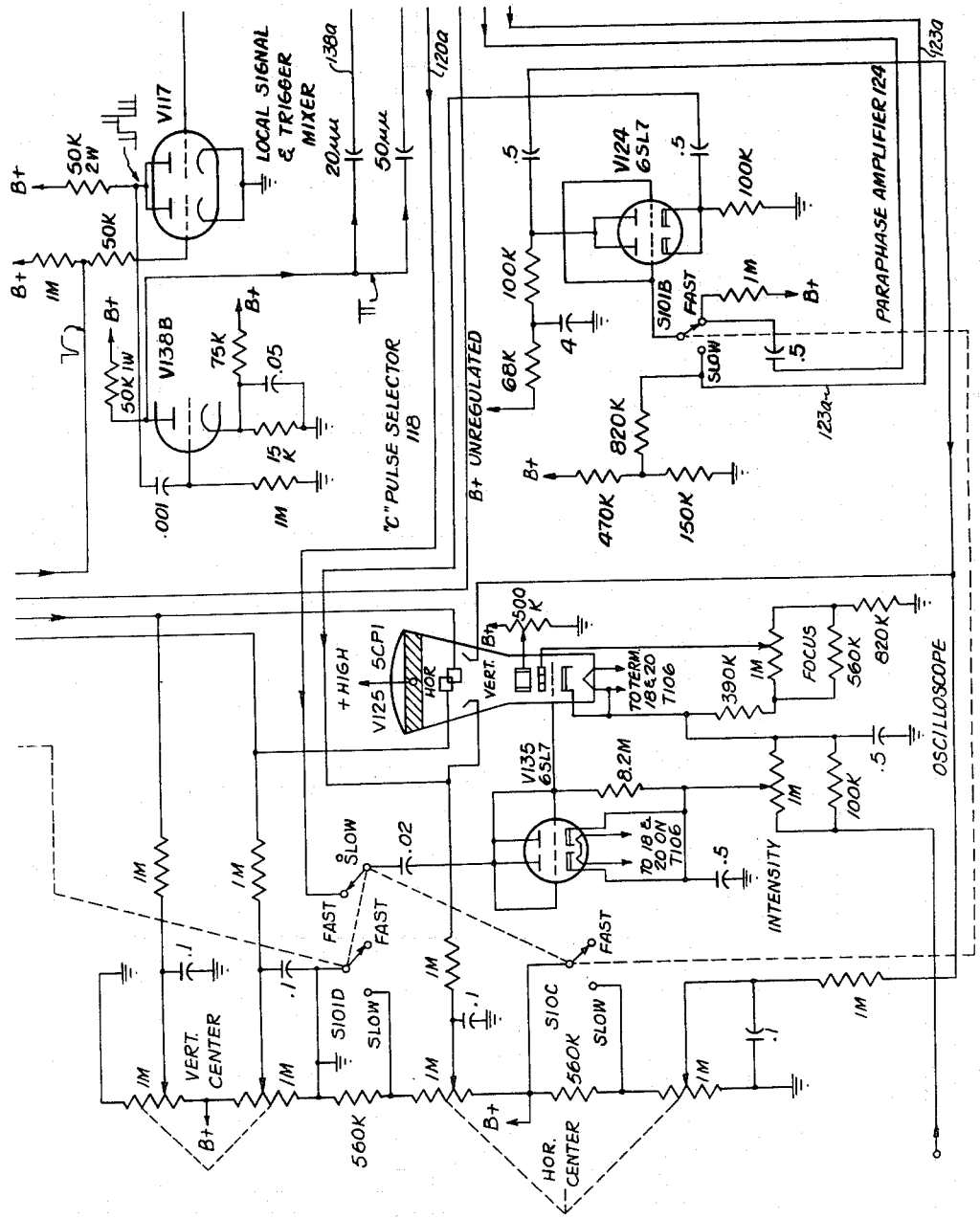
Fig. 2-C

Nov. 3, 1959  T. J. HICKLEY ET AL  2,911,642
ELECTRONIC POSITION INDICATOR
Filed Dec. 19, 1955  18 Sheets-Sheet 6

Fig. 2D

INVENTOR
Thomas J. Hickley
Clarence A. Burmister
Richard R. Ross
BY Arthur Vinograd
Leonard F. Stoll  ATTORNEY
  AGENT INVENTORS
Thomas J. Hickley
Clarence A. Burmister
Richard R. Ross
BY
Arthur Vinograd
Leonard F. Stoll   ATTORNEY
              AGENT Nov. 3, 1959  T. J. HICKLEY ET AL  2,911,642
ELECTRONIC POSITION INDICATOR
Filed Dec. 19, 1955  18 Sheets-Sheet 10

INVENTOR
Thomas J. Hickley
Clarence A. Burmister
Richard R. Ross
BY
ATTORNEY
AGENT

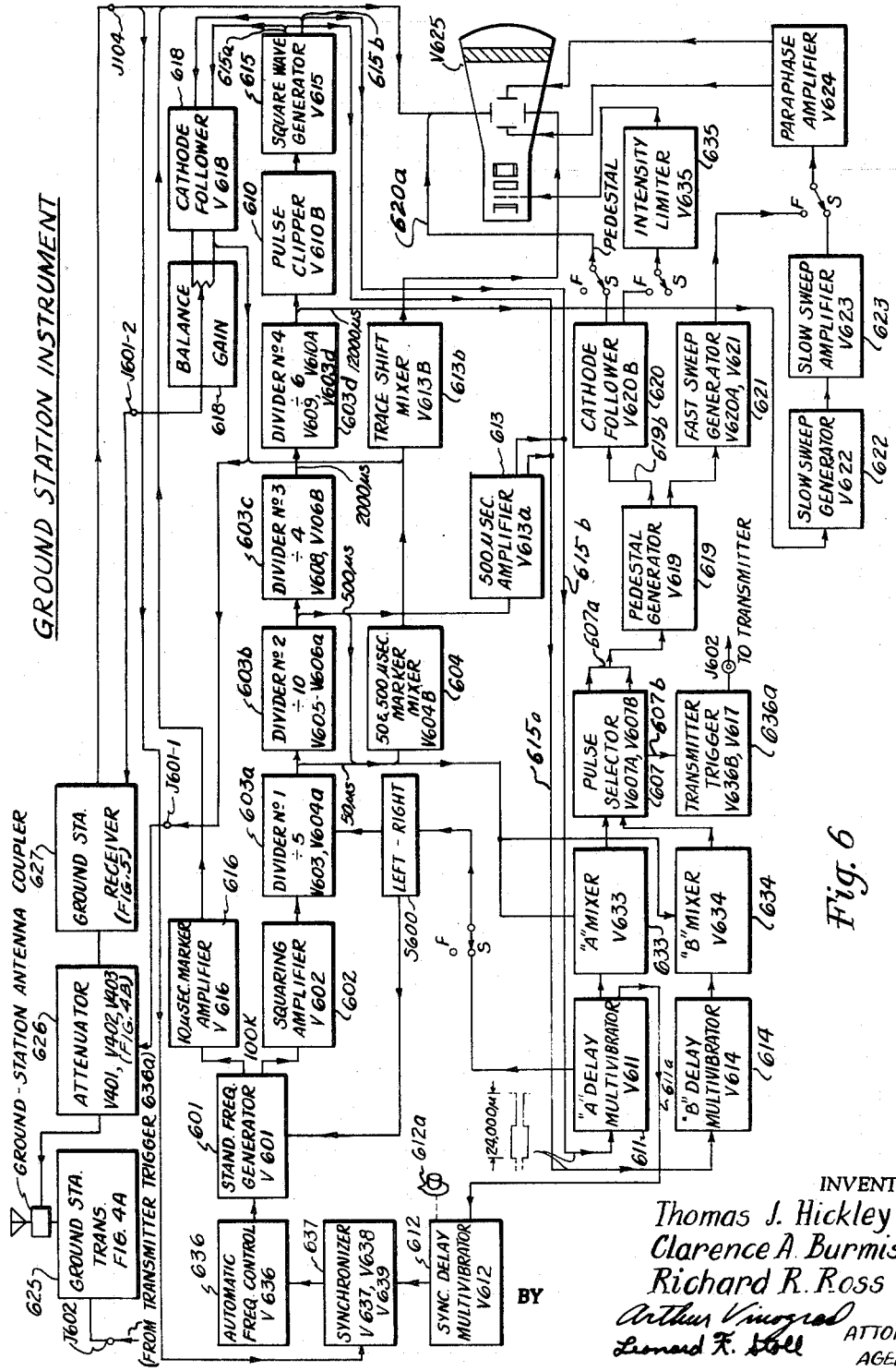

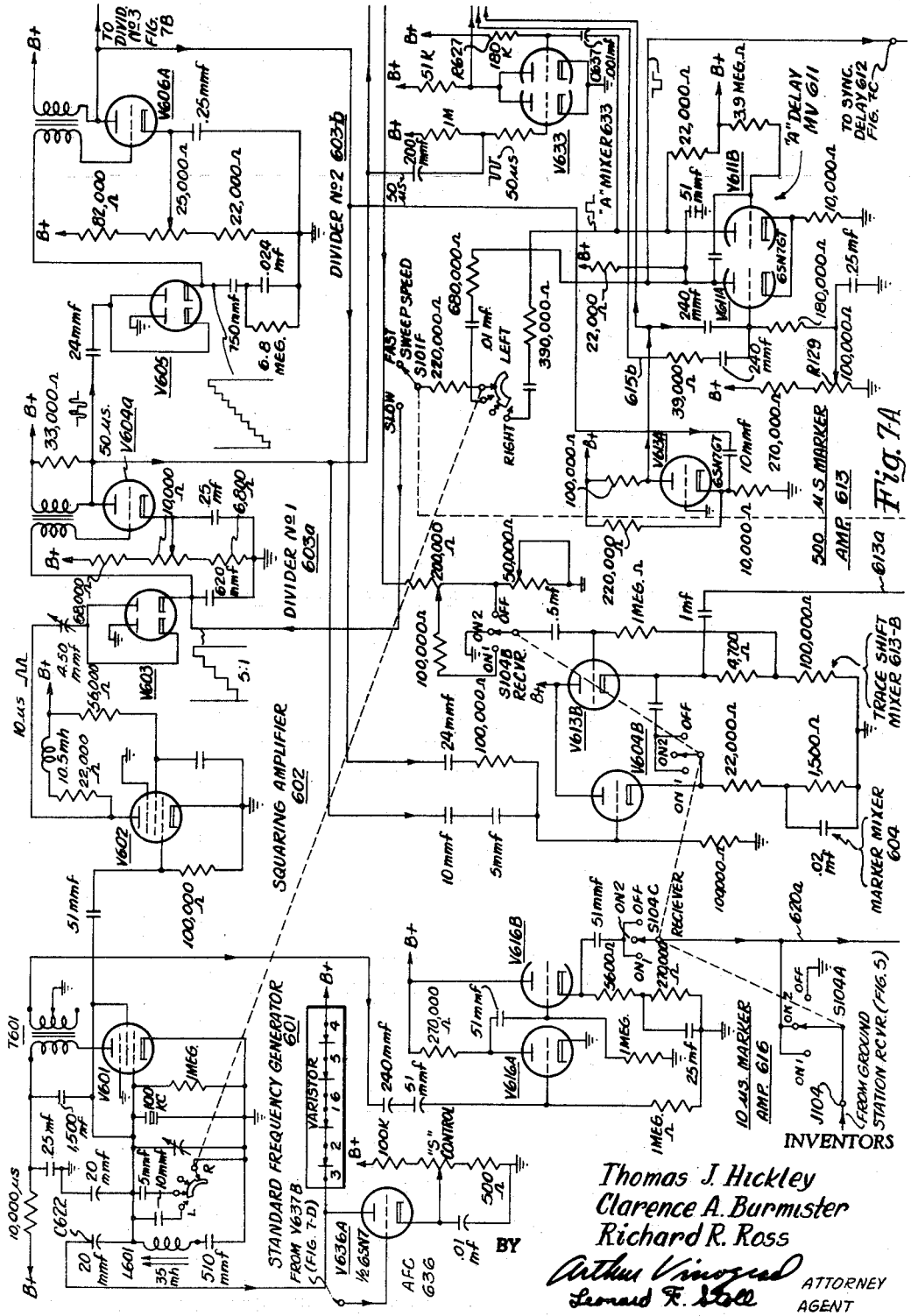

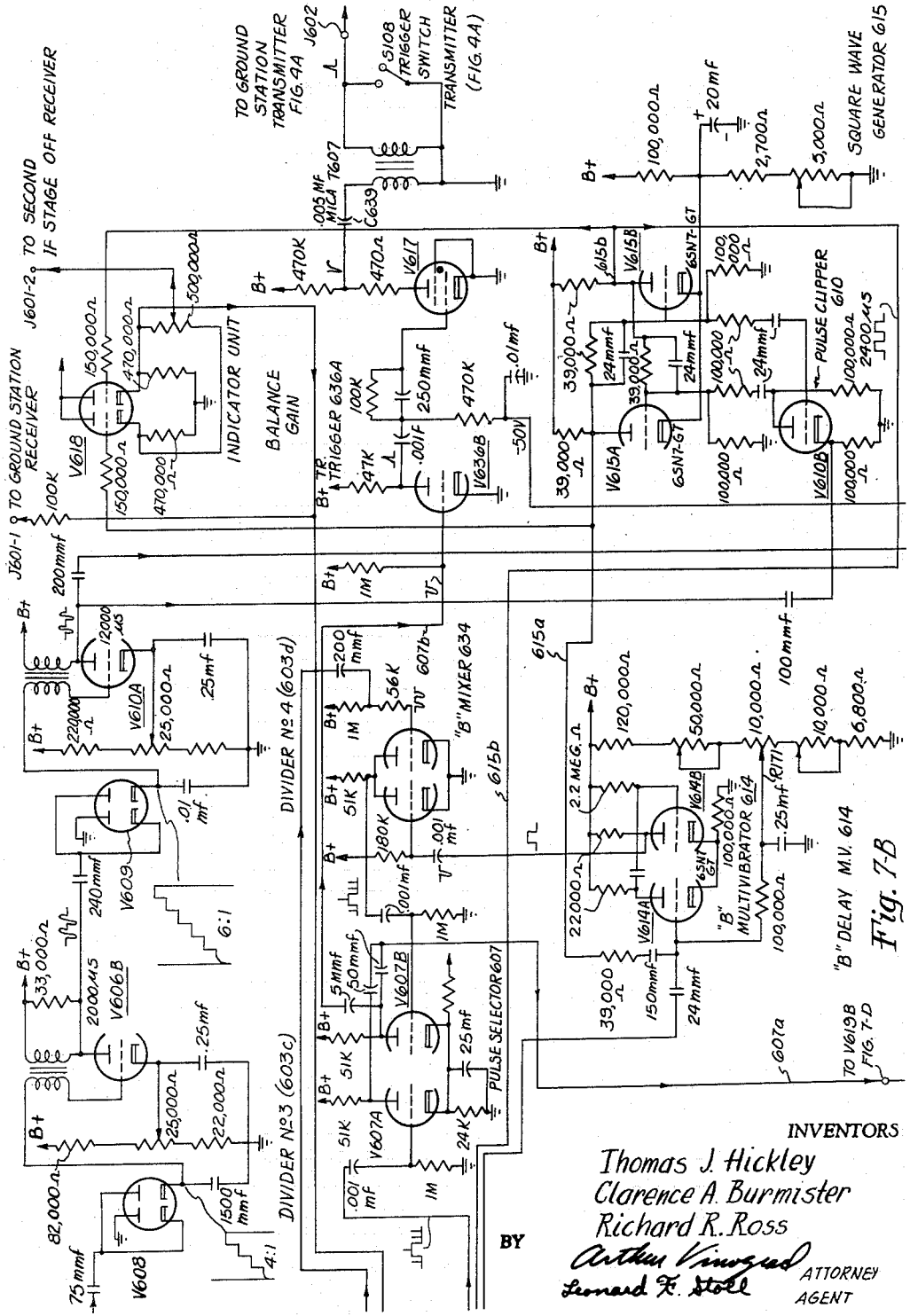
Fig. 7-B
INVENTORS
Thomas J. Hickley
Clarence A. Burmister
Richard R. Ross
BY Arthur Vinogrand ATTORNEY
Leonard F. Stoll AGENT

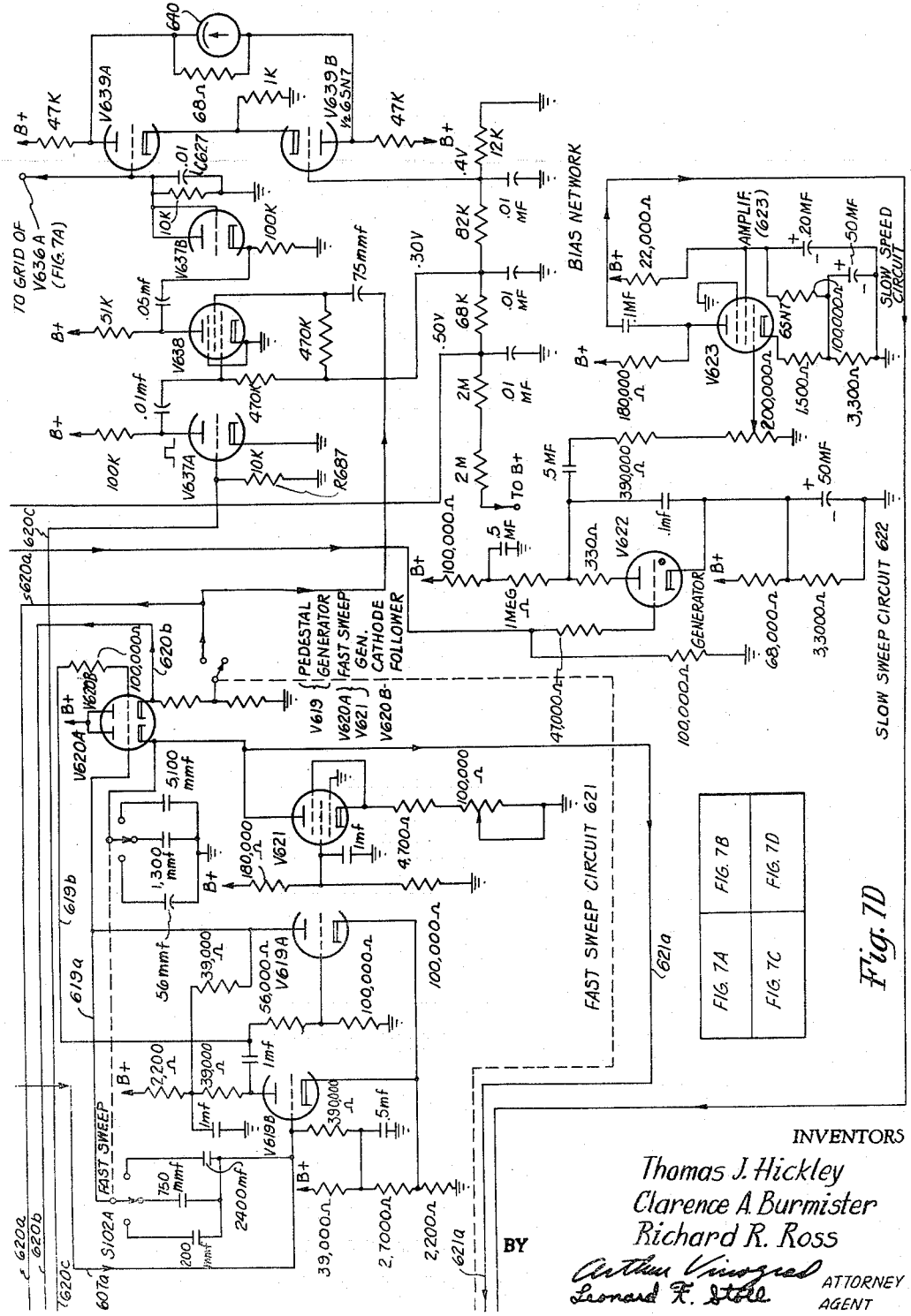

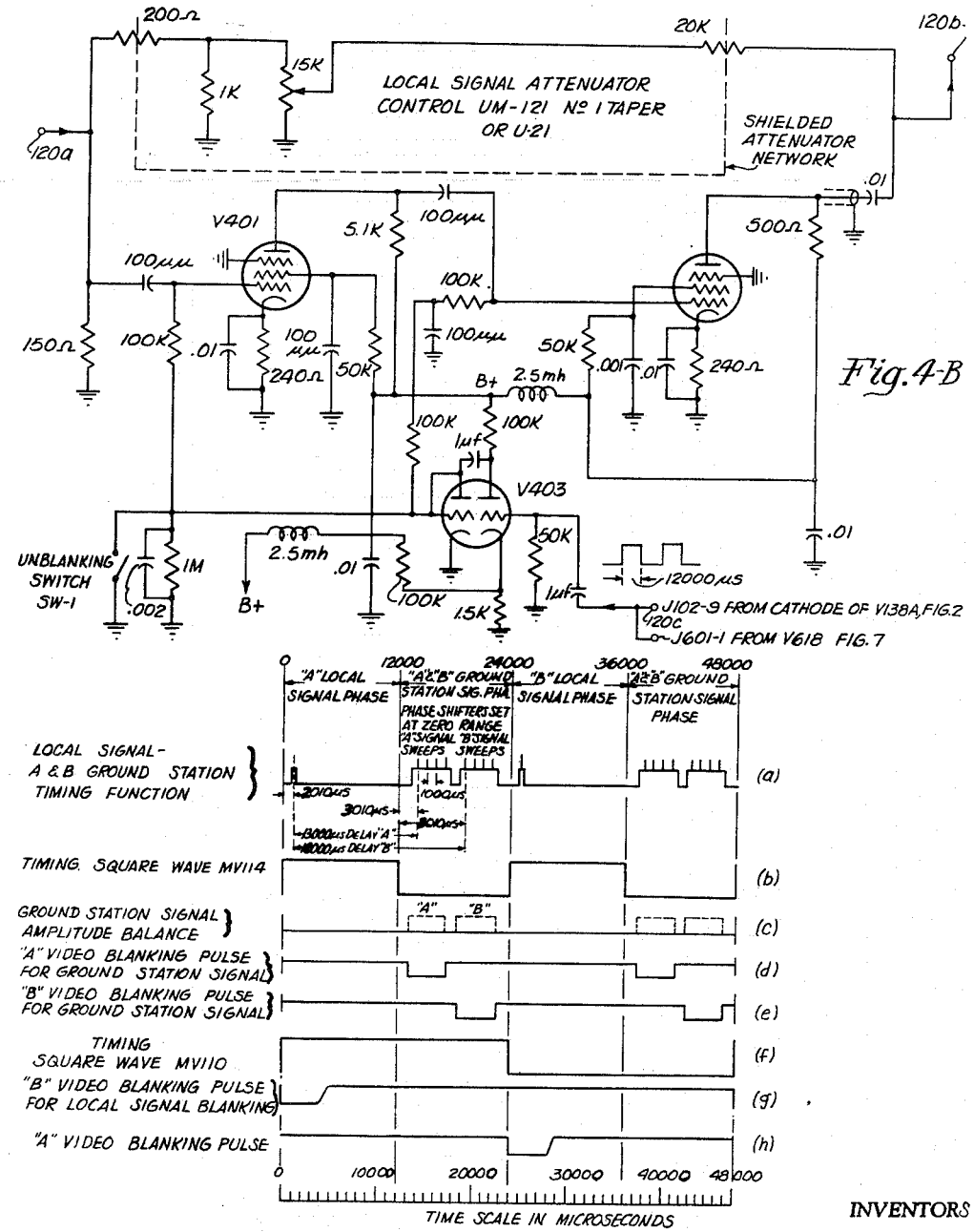

Nov. 3, 1959     T. J. HICKLEY ET AL     2,911,642
ELECTRONIC POSITION INDICATOR
Filed Dec. 19, 1955     18 Sheets-Sheet 18

INVENTORS
Thomas J. Hickley
Clarence A. Burmister
Richard R. Ross
BY Arthur Vinograd
Leonard F. Stoll
ATTORNEY
AGENT

United States Patent Office 2,911,642
Patented Nov. 3, 1959

2,911,642

ELECTRONIC POSITION INDICATOR

Thomas J. Hickley, Silver Spring, Clarence A. Burmister, Bethesda, and Richard R. Ross, Silver Spring, Md., assignors to the United States of America as represented by the Secretary of Commerce Application December 19, 1955, Serial No. 554,107

18 Claims. (Cl. 343—15)

This invention relates to precision navigation systems and particularly contemplates a single-frequency radio ranging system for accurately determining the position of a mobile transmitting station with respect to two or more prelocated fixed ground stations.

In conducting hydrographic surveys, it is necessary to correlate depth soundings with the exact geographic position at which the particular soundings are taken. While it is possible to accurately determine the position of a ship by employing optical sighting techniques, such methods are inherently slow, dependent upon atmospheric conditions, and limited in range. The advantages of a radio-wave ranging system are obvious. Fixes can be obtained at virtually electronic speeds, regardless of atmospheric conditions and at ranges which considerably surpass the possibilities obtainable by optical methods. However, while known long-range navigation systems are sufficiently accurate for ship navigation and maneuvering, and high-frequency short-range line-of-sight radio systems have been devised for precision navigation, so far as is known, no such system has been devised which is simple and yet sufficiently precise over large survey areas and distances to furnish information exact enough for chart making.

It is therefore an immediate object of this invention to provide a low-frequency radio-ranging system which is suitable for obtaining navigational fixes of high accuracy over relatively large survey areas.

Another object of this invention is to provide a highly accurate radio navigation system of the multiple ground-station type which operates on a single-carrier frequency and at one pulse repetition frequency.

An additional object of this invention is to provide a precision radio navigation system employing a mobile and a plurality of fixed stations which permits simultaneous measurements of said mobile station with respect to each of said fixed stations;

Still another object of this invention is to provide a radio navigational system in which the visual display unit in the mobile station employs a sequential blanking system to permit the simultaneous display of the information signals derived from each of a plurality of fixed stations.

A still further object of this invention is to provide a precision phase-shifting system which cooperates with a cathode-ray tube visual display mechanism in a radio-ranging system to shift the time position of the cathode-ray sweep circuits so that the sweep times correspond with the returning fixed station pulses, thus enabling synchronization of the transmitted inquiry signals with the responding signals.

An additional object of this invention is to provide a navigational system in which means are provided for compensating for the variable delay through the mobile and fixed station receivers by amplitude matching of the received signals and the local reference signal.

Further objectives of this invention are to provide a precision radio navigational system which eliminates the need for lane counting or identification; in which the accuracy of range determination does not vary with distance from station as in conventional hyperbolic systems and in which there is no loss of position or ambiguity because of system interruption or failure.

A final object of this invention is to provide a radio navigational system in which instantaneous simultaneous measurements of the ranges between a mobile and a plurality of ground stations can be determined and which uses a delay system to positively identify each of such ground stations at the mobile station.

Other uses and advantages of the invention will become apparent upon reference to the specification and drawings, in which Figs. 1A–1B are block diagrams showing the electronic position indicator mechanism comprising the ship, or movable station, equipment;

Figs. 2A–2D and 3A–3B are circuit schematics detailing the mechanism outlined in Fig. 1;

Figure 5:
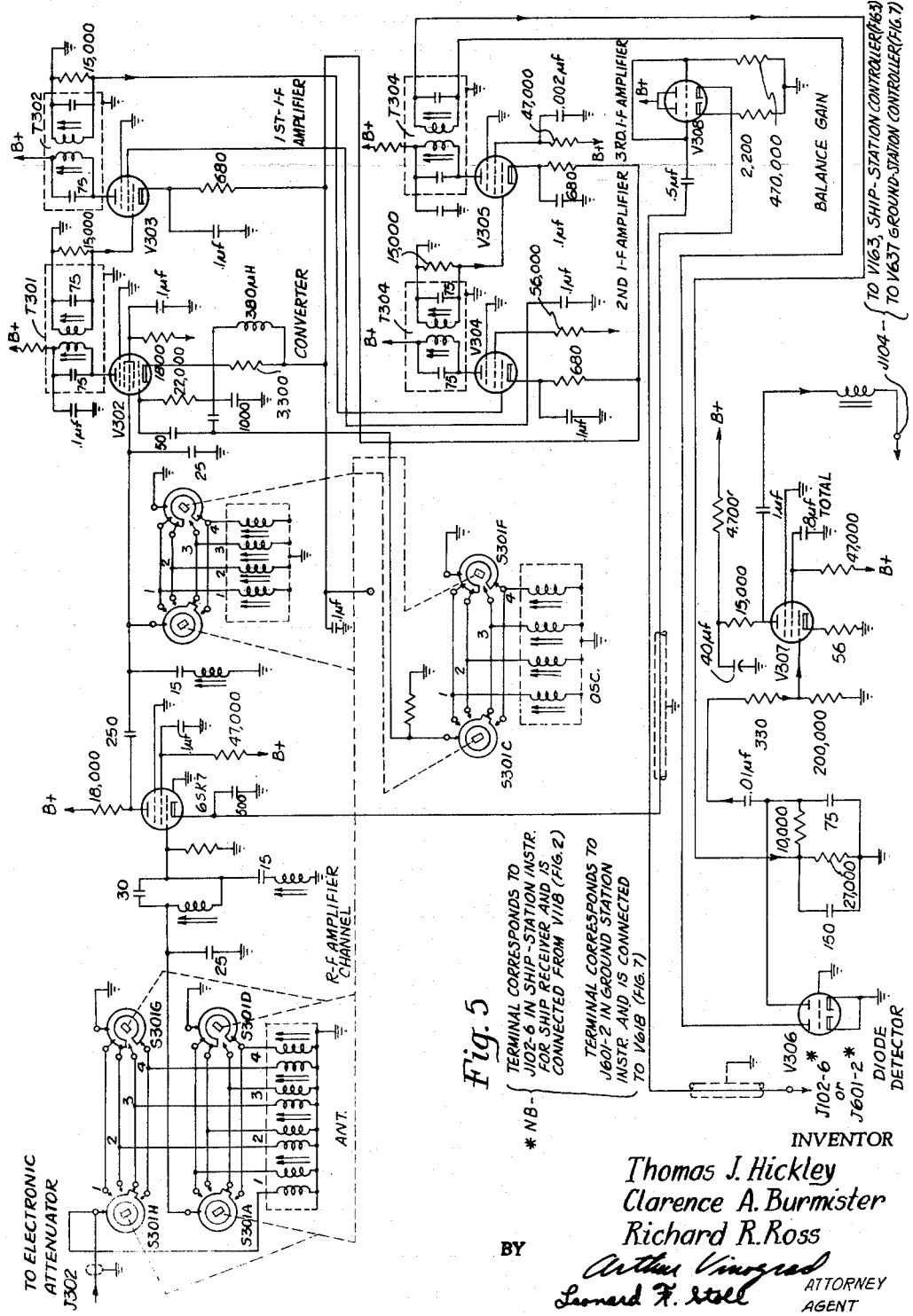
Figure 8:
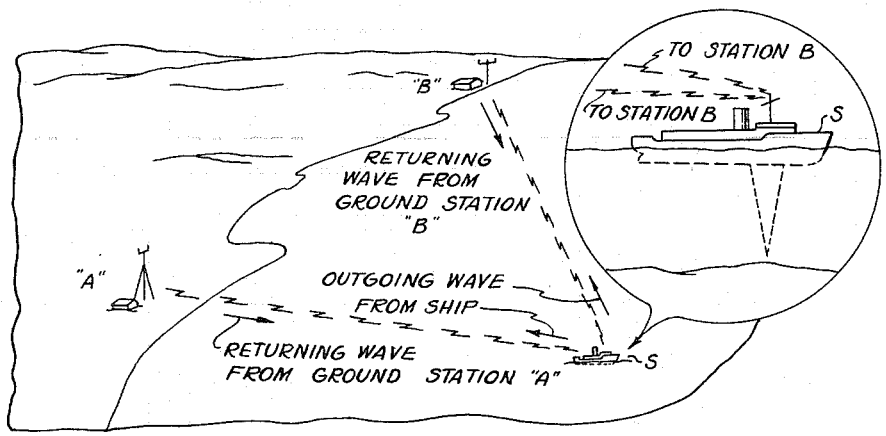
Figure 9A:
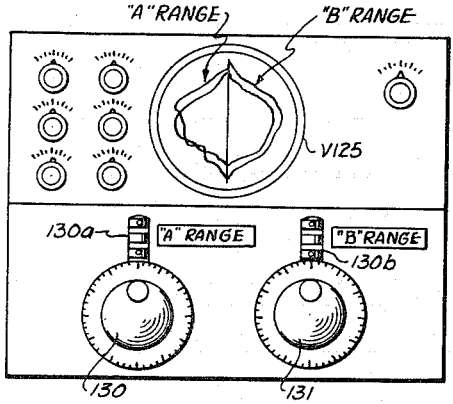
Figure 9B:
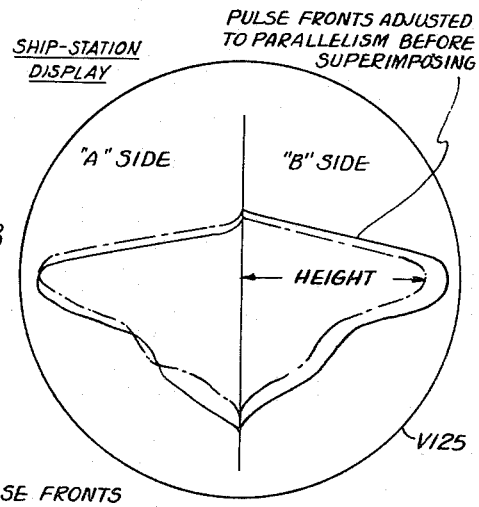
Figure 9C:
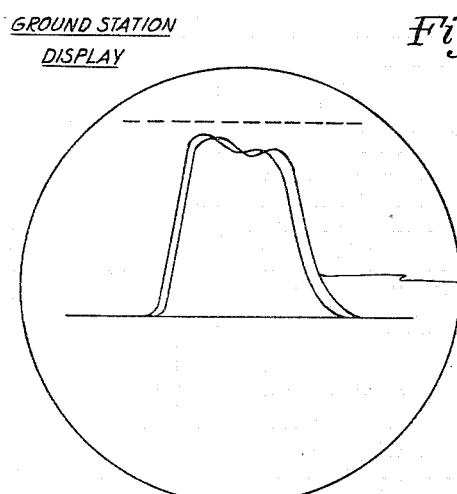
Figure 11:
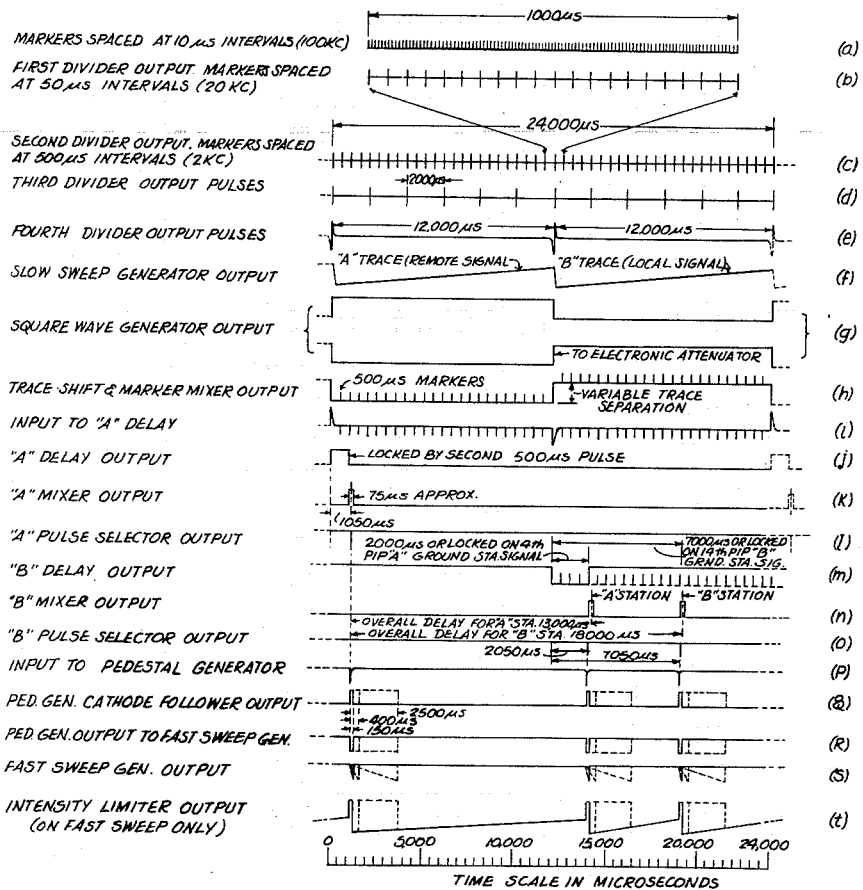
Figure 12:
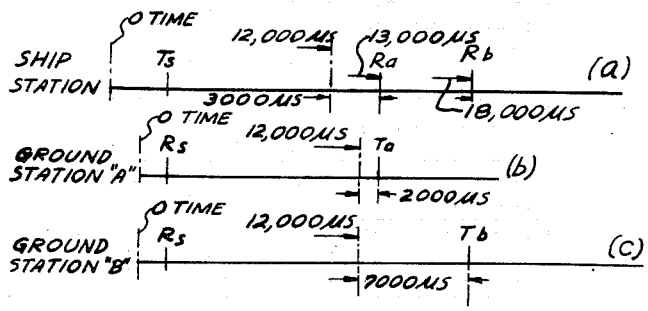

Fig. 4B (shown on the same sheet as Fig. 10) is a circuit diagram of the attenuator unit used in connection with the transmitter in both the ship-station and ground-station equipment;

Fig. 5 shows the construction of the receiver unit forming part of both the ship-station and ground-station equipment;

Fig. 6 is a block diagram of the ground-station instrument;

Figs. 7A–7D form a circuit schematic showing the specific construction of the various components in the ground-station instrument;

Fig. 8 is a pictorial representation of a typical ship-ground station setup;

Figs. 9A–9C show the visual indicator mechanism forming part of the ship- and ground-station apparatus according to this invention and typical observed display patterns;

Fig. 10 is a timing diagram showing the waveforms at various points in the ship-station equipment;

Fig. 11 is a similar timing diagram showing the waveform at essential points in the ground-station instrument, and Fig. 12 is a theoretical timing diagram for illustrating the operation of the delay features of the invention.

The general purpose of the navigational system comprising the present invention is symbolically portrayed in Fig. 8. In conducting hydrographic surveys, soundings are obtained by means of echo-ranging equipment mounted on a survey ship "S" as indicated in the magnified view in Fig. 8. To correlate the depth measurements so obtained with fixed locations on a navigational chart it is necessary to accurately locate the exact geographic position of the survey vessel when such sounding is obtained. In accordance with the principles of the present invention, a radio navigation system is employed in which a transducer on the survey ships, identified as the mobile unit, cooperates with transponders located at a plurality of fixed ground stations, "A" and "B," the positions of which can be predetermined with a high degree of accuracy. Since the base line distance between the fixed stations can be measured with great precision, if the range between the mobile station and each of the fixed stations is ascertained, the position of the survey ship can be established with great accuracy by triangulation.

The electronic position indicator comprising the present invention establishes the position of the survey ship "S" by measuring the round-trip time for a radio pulse, initiated on the ship or mobile station, to travel to the two ground stations respectively and return to the ship. Since the positions of the two ground stations are known and the velocity of the radio signal is known, then the position of the ship from the two ground stations can readily be determined by the apparatus of this invention.

In accordance with the principles of this invention long-distance measurements are feasible because of the frequency of the radio signal employed. For frequencies lower than 5 megacycles, for example, a ground wave is propagated for considerable distances, whereas higher frequency ground waves are attenuated because of the imperfect conduction and other electromagnetic characteristics of the soil or water over which the radio waves must travel. The useful range of high-frequency type radio navigation systems is therefore limited, generally varying from 10 to 80 miles depending upon the elevation of the coast line where fixed reference stations are established. The electronic position indicator of the present invention employs a frequency of 1850 kc., which frequency gives optimum range characteristics. It may be observed that such frequency can readily be shared with Loran without interference. The electronic position indicator of the present invention is therefore complementary to Shoran type systems and is employed to extend the survey range beyond the line-of-sight limitation inherent in high-frequency systems. Since for frequencies below 5 mc., a ground wave is propagated for considerable distances, accurate dependable measurements are obtainable for distances as great as 500 miles (in the absence of bad static conditions) by the mechanism of this invention.

As is well known, ground waves follow the contour of the earth and also extend to great heights above the earth. These waves induce fields into the earth for a short depth. The earth-induced waves in turn reinduce a field above the earth. These waves supplement each other as they travel outward. However, at the relatively low frequencies employed in connection with the present invention, it is difficult to start electric circuits rapidly because of the relatively high electrical inertia required for the circuits at such frequencies. Also, the amount of space occupied in the radio spectrum must be limited to prevent interference with other radio signals. Since the rapidity at which the pulse starts determines, in part, the accuracy of the system, the two referred-to factors place rather stringent restrictions on the system. If higher frequencies were to be employed, where the pulse wavefront rises steeply the pulse at the receiver output can be made to trigger the ground-station transmitter without much loss in accuracy as in the known Shoran system. Such method cannot be used in the system of the present invention since the pulse at the receiver output takes an appreciable interval (8–12 $\mu$s.) to rise because of the low-frequency signal employed and large errors would therefore result due to unavoidable noise modulation of the pulse or uncontrolled variations in receiver gain.

*Preliminary description of the electronic position indicator*

The present system employs a synchronizing system at the ground stations, which precisely determines the time at which each respective ground-station responding signal is transmitted in relation to the time the ship-station inquiry or reference signal is received at each ground station. The rate at which the pulses are transmitted either at the ship or ground station is controlled by a quartz crystal oscillator. The crystal in the ship-station or oscillator is a high-precision stable crystal which is thermally controlled to maintain accurate frequency without drift. The crystals in the ground stations are not thermally controlled but are held at the same frequency as that of the ship-station crystal oscillator through a frequency control system which is synchronized by a pulse from the ship-station signal. When the ship- and the ground-station signals appear on the ground-station display scope, their wavefronts are equalized and the leading edges matched by suitable control equipment to be described. When exact synchronization between the ship and ground-station pulses is thus obtained, the pulse rates and phase relationships are so established that the ground-station will transmit its pulses at a predetermined interval following the reception of the ship's signal.

By means of a precision oscillator in the ship instrument, the ship-station and the two ground-stations are synchronously controlled in the timing of events. With an established pulse rate of 41⅔ pulses per second, each of the three stations may transmit their train of pulses independently of the others.

In the ship station, means are provided for combining precision clock-pulse frequencies of 100 kc. (10 $\mu$s.), 10 kc. (100 $\mu$s.), and 1 kc. (1000 $\mu$s.) to generate separate groups of adjustable-according-to-time 1000 $\mu$s. ground-station identifying control pulses. Such 1000-$\mu$s. pulse groups are generated respectively by "A" and "B" range units in the ship-station instrument, corresponding to the two respective ground stations, each range unit having a manually adjustable phase shifter or resolver, the dial of which may be calibrated in range units corresponding to the range between the ship and each "A" and "B" ground station. In addition, a ship-station reference control pulse is established. A display tube is provided at the ship-station having a vertical sweep and the referred-to identifying and reference control pulses provide for sequentially displaying in alternate time periods the "A" and "B" ground-station signals in superimposed relation with the local ship-station signal.

More specifically, three precision timing pedestals are established, corresponding to the "A," "B" ground stations and the "C" or ship station, respectively. Superimposed on the "A" and "B" timing pedestals are the referred-to 1000-$\mu$s. adjustable-in-time pulses from the range units while the "C" pedestal is provided with a 10-$\mu$s. clock pulse. These superimposed signals are employed to trigger the vertical deflection sweep circuit of the display tube at different delay periods; namely, 13,000 $\mu$s. for the "A" ground-station signal and 18,000 $\mu$s. for the "B" ground-station signal as will be made apparent.

The horizontal deflection plates of the display tube are alternately de-energized by a commutator arrangement which sequentially permits a display in the form of a deflection on the LH and RH sides of the vertical trace line alternating at a pulse rate of 41⅔ times per second. In this manner, when the ship-station receiver receives a signal corresponding to one transmitted from an "A" ground station, it will be displayed on the left-hand side of the display tube by the corresponding sweep initiated by the referred-to "A" time-adjustable 1000-$\mu$s. identifying control pulses. Similarly the "B" signals will be displayed on the right-hand side of the tube and on its respective sweep circuit. Since the sweep circuit for the "C" or local ship-station signal is independent of the "A" and "B" adjustable-according-to-time signals, the "C" signal will appear together with each alternate display of the "A" or "B" station signals. Hence, adjustment of suitable control knobs on either the "A" or "B" range unit can be used to match the leading edge of the corresponding "A" or "B" ground-station signal with the local ship-station signal.

The "C" sweep circuit is also used to key the ship-station transmitter and hence initiates transmission of a ship-station reference signal to each of the "A" and "B" ground stations. The ship-station transmits a continuous train of signals which arrive at each of the "A" and "B" ground stations at a time corresponding to the respective distances between the ship station and each of the ground stations. Such ship-station signals are received at a receiver provided at each ground station and are there applied to the vertical deflection circuit of a ground-station display tube which employs a horizontal display pattern.

The sweep circuit at each ground station is also clock controlled and can be locked in with the ship-station basic frequency. The sweep circuit for the ground-station display tube is actuated at a precisely defined delay interval with respect to the ship station.

The local ground-station signal at each ground station is displayed on a sweep, the circuit of which also triggers the ground-station transmitter. Hence, when the wavefront of the received remote ship-station signal is equalized with the local ground-station signal and their leading edges matched by matching the displays on the ground-station display tube, the pulse rate and phase relation between the ship and ground-station signals are such that the ground station will transmit a responding signal corresponding to the received ship-station signal but at a precisely defined delay period thereafter.

At this point it may be noted that if the received and transmitted pulses at the ground station actually were to occur at the same time, no delay period would be involved and the indicating equipment at the ship station, by measuring the elapsed time between its transmitted pulse and the reception of the corresponding signal from the ground station, would determine the exact range between the ship and ground stations. However, since two separate range measurements are involved in accordance with the system of the present invention, it is necessary to distinguish between the signals coming from each of the "A" and "B" ground stations in order to avoid ambiguity. Since the present invention employs a single frequency of operation, a different precisely defined delay period is provided at each respective ground station in order to discriminate between the stations.

Specifically a 13,000-μs. delay period is provided at the "A" ground station while the "B" ground station employs an 18,000-μs. delay. Since both the ship-station and ground-station instruments are precisely clock controlled, such delay periods are held constant and are used as a means for identifying the respective ground stations.

The instrument at the "A" ground station inserts a 13,000-μs. delay between the time of arrival of the ship-station signal and the time of transmission of the related ("A") ground-station signal. An 18,000-μs. delay period is similarly provided for in the "B" ground-station instrument. Since such delay periods are identical with the referred-to like delay periods provided in the "A" and "B" display sweeps in the ship-station instrument, they automatically cancel and, when such ground-station signals are then received at the ship-station and there matched with the reference signal provided by the ship-station local signal through adjustment of the described "A" and "B" range control knob dials, the dials associated with such knobs will register the range to each station, respectively.

With the above brief outline of the over-all operation in mind, the construction and operation of the ship-station and ground-station instruments follows.

Ship-station instrument

The equipment comprising the ship-station instrument performs three principal functions: (1) to transmit reference signals of electromagnetic energy to the ground stations; (2) to receive similar responding signals from the ground stations together with the attenuated ship-transmitted reference signal and (3) to present all three of these pulses to a visual display indicator in such manner that, when the leading edges of the received ground-station pulses are properly matched with the respective ship-station pulses, the distance between the ship and each ground-station, respectively may be read off on suitably calibrated range dials forming part of the pulse matching means in the ship-station instrument.

Figure 1B:
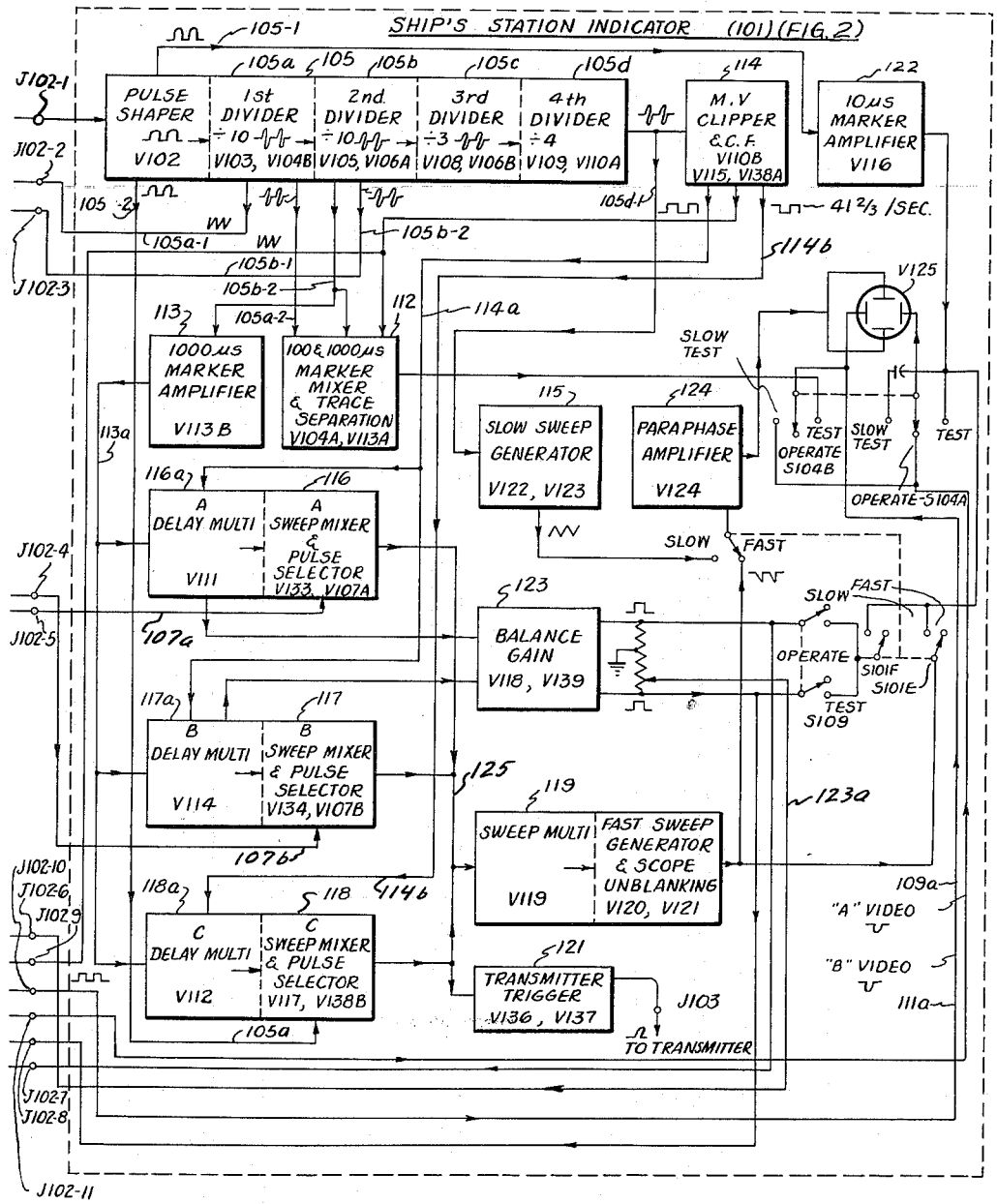

The ship-station equipment may be considered as being made up of four basic units: A controller, an indicator, a receiver, and a transmitter. Figures 1A and 1B when considered together comprise a schematic block diagram showing the general relationship of the ship-station equipment. The ship-station instrument comprises a controller generally indicated by reference numeral 100 in Fig. 1A, an indicator 101 (Fig. 1B), a receiver 102 (Fig. 1A), an attenuator 120, and a transmitter 103. The controller construction is detailed in Fig. 3, the indicator 101 is shown in Fig. 2, the receiver 102 in Fig. 5, the attenuator 120 in Fig. 4B, and the transmitter in Fig. 4A.

As previously outlined, the ship-station instrument provides means for separately displaying in sequence on an indicating device, the responding signals received from two remote ("A" and "B") ground stations together with the local "C" or ship-station reference signal, means for matching each of the "A" and "B" ground-station signals, respectively with the ship-station signal and means for transmitting the ship-station signal to the "A" and "B" ground stations.

The system employed in this invention for accomplishing such over-all result is to establish separate signal display sweep patterns on a common indicator, the sweep patterns occurring at different delay periods and being sequentially exhibited in separate portions of the display means by a switching or commutating device at a repetition frequency of 41⅔ times per second.

The means for controlling the display indicator for exhibiting the described type of signal pattern will first be described. The various components for accomplishing such purpose can be conveniently divided into a ship-station controller unit 100 and an indicator unit 101 shown in block diagram form in Figs. 1A and 1B.

The ship-station controller unit is identified by reference numeral 100 in Fig. 1A and is detailed in the circuit schematic of Fig. 3. The controller includes a highly stable, thermally controlled fixed frequency oscillator 104 (Fig. 1A) which supplies 100 kc. timing or clock pulses to the ship-station indicator unit 101 to be described and to a three-part resolver or phase-shifter unit 106 forming part of the range unit in the controller 100. The controller also includes a plurality of similar mixer-amplifier units 107 and 108, "A" and "B" blanking circuits 109, 111 for the visual display unit, and a clock-pulse controlled multivibrator 110.

The timing of the entire system is controlled by the clock pulses from the precision oscillator 104. The oscillator is a thermally-controlled precision crystal oscillator which is shown in Fig. 3B as comprising the tubes V141, V142. The output is applied through connector J102–1 to tube V102 of the divider 105 forming part of the indicator unit 101 detailed in Fig. 2. The chain divider 105 includes divider units 105a, 105b, 105c, and 105d which provide clock pulses, in addition to the 100 kc. fundamental, of 10 kc., 1 kc., ⅓ kc. and 1/12 kc., respectively corresponding to the divisional factors of 10, 10, 3 and 4.

Divider 105

The manner of obtaining the referred-to clock pulse frequencies will be described in connection with the circuit diagram of Fig. 2.

The step-charger-type divider circuit 105 which provides the clock timing pulses to the various circuit elements comprising the ship-station instrument, Fig. 1 forms part of the ship-station indicator 101. The indicator mechanism is detailed in the circuit diagram of Fig. 2 to which reference will be made in describing the specific construction of the indicator components as the description proceeds.

Figure 2B:
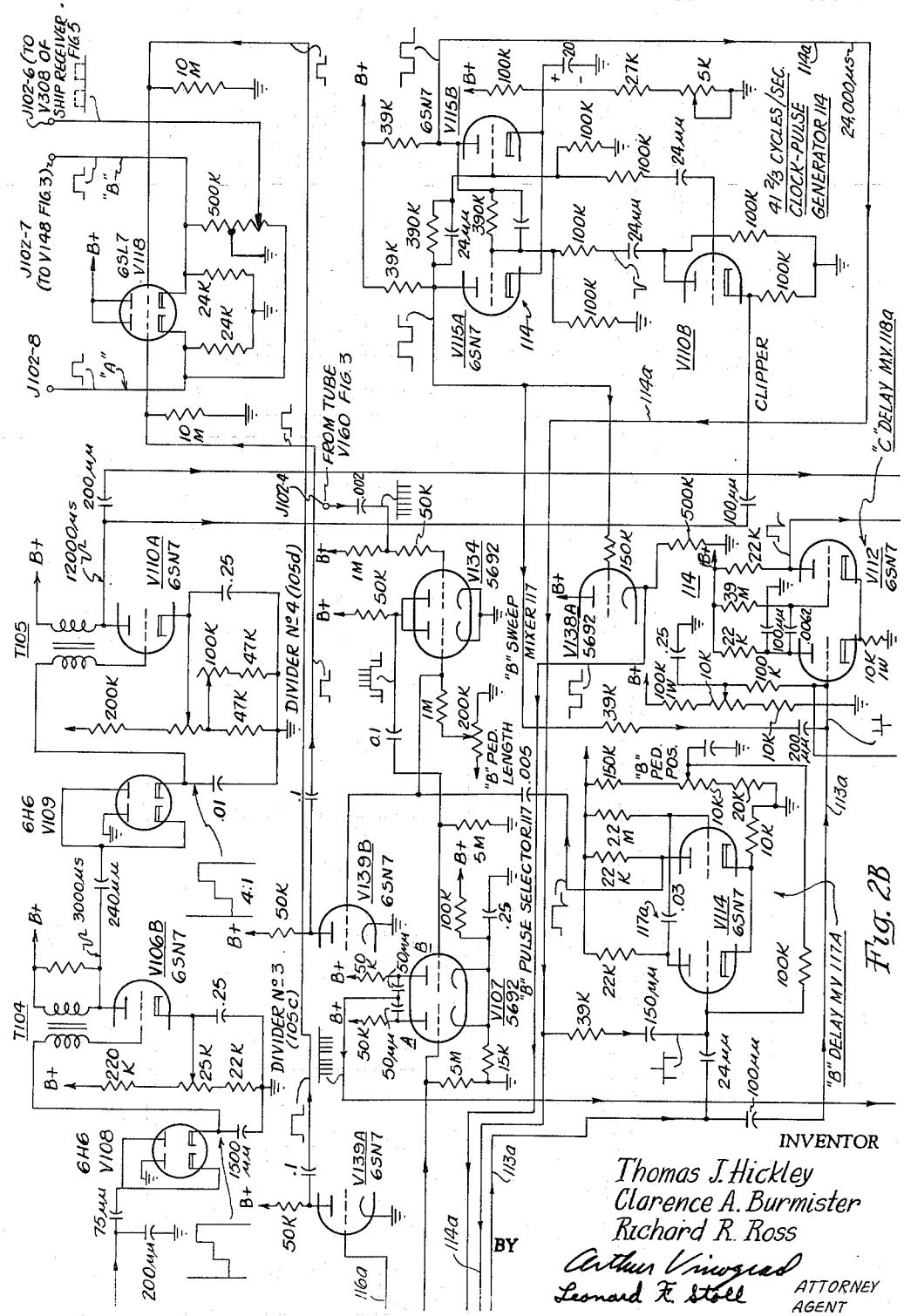

The divider 105 comprises the circuit detailed in Figs. 2A and 2B including the tubes V102, V103, V104, V105, V106A, V108, V106B, V109, and V110A. In addition, a multivibrator 114 comprising tubes V115 and V138A (Fig. 2B) is provided in series with the divider 105 to provide additional timing pulses for a purpose to be described. The 100-kc. timing pulses from oscillator 104 (i.e. tube V142A, Fig. 3B) are applied through connector J102–1 to the pulse shaper tube V102 (Fig. 2A) which is connected as a squaring amplifier. One output from the pulse shaper is applied through conductor 105—1 to a 10-μs. marker generator 122 comprising tube V116 while a second output is applied through conductor 105—2 to the sweep mixer-pulse selector 118 comprising the tube circuit V117, V138B. The function of the circuits 122 and 118 will be subsequently described. The output of the pulse shaper tube V102 is also fed to the input of the first stage 105a of the divider chain comprising the tubes V103, V104B. Tube V104B of such divider stage is held at cutoff by the bias developed by the cathode-to-ground potential taken off potentiometer R109. This potentiometer is part of a voltage divider circuit made up of resistors R108 and R110 and the cathode by-pass capacitor C114A. The grid-to-cathode D.C. bias voltage is the difference between the voltage across the capacitor C112 in the grid circuit and the voltage across capacitor C114A connected between the cathode and ground. When there is no charge on C112, the grid bias is set by the cathode potential and the plate current in the tube will be cut off.

The negative and positive pulses from the pulse shaper V102 are applied to the right-hand plate of V103. The negative pulses are grounded, but the positive pulses are passed by diode V103 and stored in capacitor C112. As the positive pulses cannot discharge through the diode, the potential of C112 and the grid of V104B are raised one step for each positive pulse. The magnitude of this voltage rise is dependent upon the values of the capacitors C111 and C112 and the value of the input voltage. Counting from a time when there is no charge on the capacitor C112, the fifth applied pulse will decrease the grid bias to a point where plate current begins to flow in the triode section of V104B.

The consequent rise in plate current induces a voltage across the grid winding of transformer T102. The transformer windings are close coupled in a manner such that a rise in plate current will drive the grid of V104B more positive, producing a further rise in plate current. The tube thus becomes saturated in a very short time. Such action is accompanied by a surge of grid current which discharges storage capacitor C112. At this point, the plate current ceases to increase and the voltage across the grid winding of transformer T102 drops sharply. As the grid voltage drops, the plate current falls off.

The voltage induced across the grid winding of the coupling transformer T102 is reversed in polarity from the previously described condition of rising plate current, and the grid bias is carried sharply negative past cutoff. The negative charge placed on C112 is quickly reduced to zero by the conductivity of diode V103 and the counting cycle begins anew.

Capacitor C111 is discharged between each charging of capacitor C112 through the first diode section of V103 so that no charge is left on capacitor C111 between cycles. When plate current starts flowing in tube V104A, a large signal will be induced at the plate by reason of the plate winding of T102. This is a condition similar to ringing and the resistor R107 produces slightly less than critical damping, resulting in only a single cycle output. The 10-kc. output pulses from the first divider stage 105a are applied through terminal J102-2 to the phase shifter 106 of the controller shown in Fig. 3 and through lead 105a-2 to a 100, 1000 μs. marker circuit 112 comprising tubes V104A and V113A of the ship's indicator. The function of the components 112, 106 will subsequently be described.

The output pulses from triode V104B of the first divider 105a are next applied to the second clock pulse divider stage 105b comprising the circuit including tubes V105 and V106A shown in Fig. 2A. The construction and operation of the second divider stage 105b as well as the remaining divider stages 105c (tubes V108, V106B, Fig. 2B), and 105d (tubes V109, V110A) are similar in construction to the first divider stage. As mentioned these divider stages provide frequency divisions of 10, 3, and 4, respectively. The differences in the divider factors are obtained by the respective voltage divider circuits associated with each stage.

The referred-to clock-pulse generator 114 designated in Fig. 1B provides the 41⅔ pulse repetition rate to which the various instruments are synchronized. The generator 114 includes the circuit comprising tubes V110B, V115, and V138A shown in the right-hand portion of the ship's indicator circuit diagram (Fig. 2B). The purpose of this circuit is to divide the operating period of both the transmitter 120 and the indicator tube V125 into two equal parts so as to separate, in timing, (i.e. commutating) the sequence of events that occur in each cycle. Signals from the fourth divider 105d trigger the bistable generator V115A, V115B, through a clipper circuit comprising tube V110B. The bistable circuit is a conventional multivibrator in which one of the tubes V115A or V115B will be conducting while the other is cut off until triggered to a reverse state of conduction by a subsequently applied triggered pulse. Assuming that for example V115B is initially nonconducting, the application of a negative trigger pulse to the grids of both V115A and V115B tends to drive the grid of the conducting tube V115A to cut off and a switching effect will therefore result. Accordingly, separate square-wave timing pulses as shown in timing diagram Fig. 10B will be generated at each of the plates of tube V115 for application to the various delay multivibrators 116a, 117a, and 118a (Fig. 1). Such commutating pulses are also transmitted to the blanking circuits 109 and 111 through terminal J102-9 indicated in Fig. 1B and a second multivibrator 110 as shown in Fig. 1A. The commutating pulses are also concurrently applied to the electronic attenuator 120 as shown in Fig. 1A.

Since the multivibrator 114 is triggered by the ½ kc. output from the fourth divider stage 105d, it provides an output frequency of (½ × 1/12) or 41⅔ cycles per second. The output waveform obtained from multivibrator 114 as indicated in Fig. 10B consists of square waves of alternate polarity each having a 12,000-μs. duration.

The means for providing the various required timing pulses for the various circuit components having been described, a description of the remainder of the ship-station instrument follows with particular reference to Figs. 1, 2, and 3 of the drawings.

As has been stated, the ship-station instrument provides means for sequentially displaying the "A" and "B" ground-station signals alternately in different portions on a single indicator device at a repetition rate of 41⅔ times per second. Since a vertical sweep is provided for displaying the signal patterns on the visual indicator tube V125 shown in Figs. 1B and 2C, alternate control of the energization of each horizontal deflection plate in sequence at a repetition rate of 41⅔ times per second will result in energization of first the left-hand and then the right-hand sections of the tube. The "A" and "B" video blanking and mixer circuits 109, 111, which are keyed by a second multivibrator 110 in response to applied clock pulses, provide a commutator switching means for producing alternate control of the energization of each half of the display tube V125 in a manner now to be described.

*Video blanking and display commutator circuits 109, 111*

The functions of the blanking circuits 109 and 111 are to separate the video signals obtained from the ship-station receiver 102 so that the "A" ground-station responding signal will appear on the left of the vertical sweep line and the "B" ground-station responding signal will appear on the right of it as shown in Fig. 9B and to concurrently blank out undesired signals so that they will not be manifested on the visual display device.

The multivibrator 110 provides a square-wave output control signal to each of the blanking circuits 109 and 111. The wave-form produced by multivibrator 110 is shown in Fig. 10F of the referred-to timing diagram. The multivibrator 110 is triggered by the 41⅔ c.p.s. signal obtained from the referred-to bistable clock-pulse generator 114 in the ship's indicator unit 101 and, by reference to Fig. 10B which shows the 12,000-μs. recurring clock pulses generated by 114, it will be apparent that multivibrator 110 is accordingly actuated to provide pulses of 24,000 μs. duration as indicated in Fig. 10F.

Figure 3A:
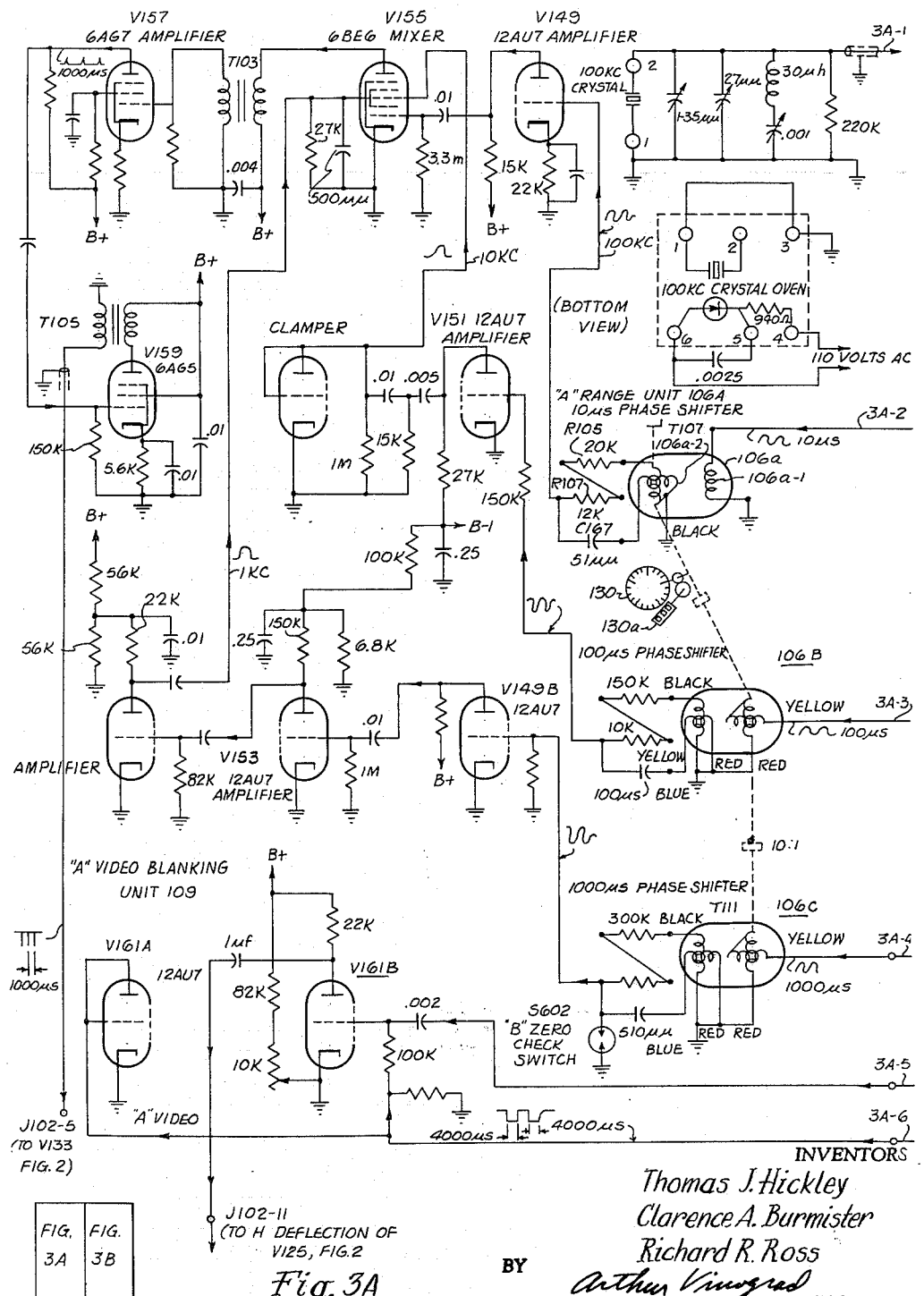
Figure 3B:
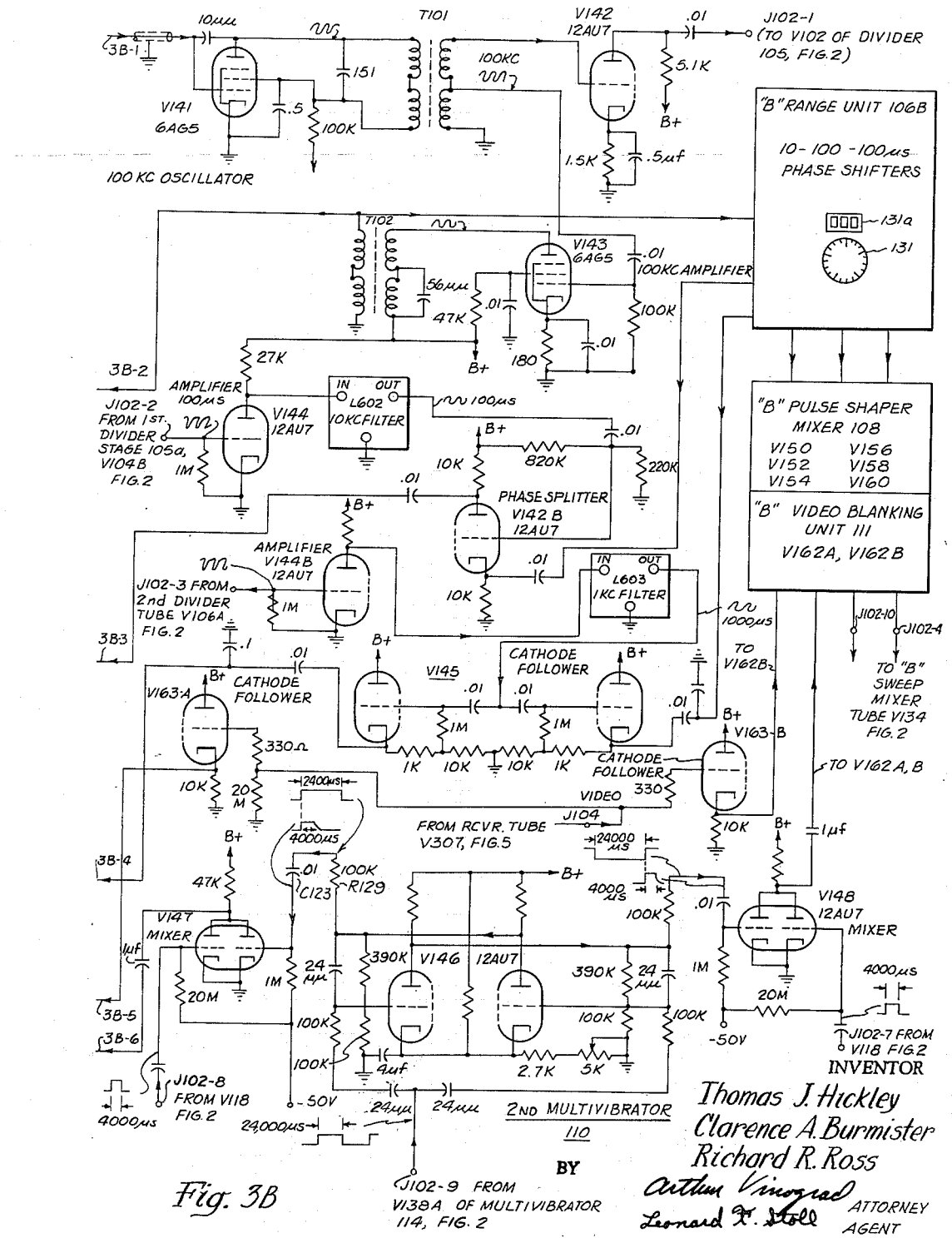

The detailed construction of the video blanking circuits 109, 111 is shown in the ship-station controller circuit diagram of Fig. 3, comprising Figs. 3A and 3B which taken together form a single circuit diagram. The circuitry comprising tubes V161A, V161B (Fig. 3A), V162A, V162B, V163A, V163B, V147, and V148 shown in Fig. 3B correspond to the components 109 and 111 indicated in block form in Fig. 1. The blanking system for the "A" range unit consists of the tubes V147, V161A, V161B, and V163A; while the circuit for the "B" range unit includes tubes V148, V162A, V162B, and V163B. Since the "A" and "B" blanking circuits 109 and 111 are identical in construction, only the details of the "A" circuit are shown in Fig. 3. The "B" blanking unit 111 is indicated in block form only in Fig. 3B.

Referring to the "A" unit blanking circuit detailed in Fig. 3, tube V163A, shown on the left portion of Fig. 3B, is employed as a cathode follower and isolates the "A" and "B" blanking circuits from each other. The positive video signal from the receiver 102 (Fig. 1) is applied to tube V163 through a connector J104 (Fig. 3B). Considering only the "A" range unit, the positive video signals from the cathode of V163A are applied through 3B-5, 3A-5 (which symbols indicate the connective points between Figs. 3A and 3B) to the grid of tube V161B (Fig. 3A) which is biased just beyond cut-off, but will pass positive video pulses for normal (unblanked) operation.

The control signals for actuating the "A" and "B" video blanking units 109, 111 are derived from the clock-controlled multivibrator 110 which, as indicated in the block diagram of Fig. 1A, is initially triggered by the clock pulses derived from the clock-pulse multivibrator 114. The blanking signal control generator 110 comprises the double triode V146 connected as a multivibrator as shown at the bottom of Fig. 3B and provides a square-wave output shown in timing diagram Fig. 10F to the mixer tubes V147 and V148 (Fig. 3B) corresponding to the "A" and "B" blanking circuits, respectively. The two input grids to multivibrator tube V146 receive through terminal J102-9 the output of tube V138A in the referred-to clock-pulse multivibrator 114 shown in Fig. 2. The clock-pulse multivibrator 114 as previously described divides the operating period defined by the divider 105 into two equal periods as shown in the timing diagram Fig. 10B so as to separate in timing, the sequence of events that occur in each cycle. The multivibrator 114 therefore triggers the blanking pulse generator multivibrator 110 which is arranged to deliver pulses of opposite polarity every 24,000 μs. as shown by the waveform in timing diagram Fig. 10E.

The square-wave output signal obtained from the right-hand section of the multivibrator V146 is applied through a capacitor to the right-hand grid of tube V147 while the output obtained from the left-hand section of multivibrator V146 is applied to the left-hand side of tube V148 as indicated in Fig. 3B. That is, during the period that a positive 24,000-μs. pulse is applied from V146 to the right-hand side of V147, a negative pulse of like duration is applied to the left-hand grid of V148 and vice versa. The left-hand grid of V147 and the right-hand grid of V148 are also connected to receive 4000-μs. positive pulses through terminals J102-8 and J102-7 which are connected respectively to the outputs of "A" and "B" delay multivibrator 116a and 117a shown in Fig. 2B. The delay multivibrator 116a, 117a, and 118a will be subsequently described.

In general, the "A" video blanking unit 109 provides a negative output blanking pulse to the right deflection plate (as seen from the face of the tube) of cathode-ray tube V125 when an "A" station signal is received and thus causes display of the "A" signal on the left-hand side of the tube. Similarly, the "B" video blanking unit 111 provides a negative blanking pulse to the left-hand deflection plate of the display tube V125 when a "B" station signal is received and thus manifests the "B" signal as a display on the right-hand portion of the tube. In addition, both the "A" and "B" video blanking units cooperate to alternately display the local ship-station reference signal in the left- and right-hand portions of the display tube concurrently with the "A" and "B" ground-station responding signals, respectively.

The manner of commutating the local ship-station reference signal for alternate display on the left- and right-hand portion of the display tube will first be described. For this purpose the 24,000-μs. square-wave output obtained from the right-hand section of the multivibrator tube V146 (Fig. 3B) is differentiated by C123 and R129 into a 4000-μs. positive pulse. Both the 24,000 and 4000-μs. waveforms are indicated in Fig. 3 adjacent R129 and C123, respectively. Such differentiated 4000-μs. positive pulse is applied to the right-hand grid of mixer tube V147 which provides a 4000-μs. negative output pulse. The output from tube V147 is indicated in the timing diagram of Fig. 10 as waveform (h) which, as indicated, occurs at a time corresponding to 24,000-μs. Such negative pulses comprise video blanking signals which function to cut off amplifier tube V161B (Fig. 3A) in the "A" video blanking unit 109.

At such time, by reference to the waveform shown in Fig. 10G, it will be apparent that the output of the mixer tube V148 in the "B" video blanking unit 111 is positive and the corresponding amplifier tube V162B in the "B" video blanking unit will be unblanked. Since, as will be subsequently described, the ship-station receiver provides video signals corresponding to the local ship-station reference signals as well as the "A" and "B" ground-station responding signals, the local ship-station reference signal applied through terminal J104 (Fig. 3B) to the cathode follower tube V163B will be amplified and inverted by tube V162B (shown in the block) and manifested as a negative output pulse. Such pulse is applied through terminal J102-10 to the left-hand deflection plate of indicator tube V125 shown in Fig. 2C where it causes display of the local ship-station reference signal on the right-hand portion of the display tube.

Similarly, on the next 24,000-μs. period, the conditions will be reversed; that is, a negative 24,000-μs. square-wave pulse will be produced by the right-hand section of multivibrator V146 while the left-hand section will provide a positive square-wave pulse. The result of such condition is to cut off tube V162B and the local ship-station reference signal will now be applied through tube V161B (Fig. 3A) of the "A" video blanking unit 109 as a negative pulse through terminal J102-11 to the right-hand deflection plate of display tube V125 thus causing display of the local ship-station reference signal on the left-hand portion of the tube.

It is apparent therefore that the commutating action provided by the clock-controlled multivibrator 110 causes the "A" and "B" video blanking units 109 and 111 to alternately display the local ship-station reference signal on the left- and right-hand portions of display tube V125 in timed relation with clock-pulse source 105.

As noted above, the video blanking units also provide for alternate display of the received "A" and "B" ground-stations responding signals in the left- and right-hand portions of display tube V125. Such display effect is accomplished in the following described manner.

It will be noted from Fig. 3B that the left-hand grid of mixer tube V147 of the "A" video blanking unit 109 is connected through terminal J102-8 to the output of the "B" delay multivibrator 117a (Fig. 1B) and the right-hand grid of mixer tube V148 of the "B" video blanking unit 109 is connected through terminal J102-7 to the output of the "B" delay multivibrator 116a. As will be later made apparent the "A" delay multivibrator 116a is synchronized with the transmitter in the "A" remote ground-station transmitter and therefore provides a delayed control pulse for displaying the "A" station signal at a specified time period. Similarly the "B" delay multivibrator 117a provides a delayed control pulse for displaying the "B" ground-station signal at a later specified period (Fig. 10A).

Accordingly a 4000-µs. positive pulse representing a sampling of the "B" delay multivibrator 117a output is applied through terminal J102-8 to the left-hand grid of mixer tube V147 in the "A" blanking unit while a similar 4000-µs. positive pulse representing a sampling of the "A" delay multivibrator 116a is applied through J102-7 to the right-hand grid of tube V148 in the "B" blanking unit. Such positive pulses will create negative sectors in the output of the respective tubes as indicated by waveform 10(d) and 10(e) in the timing diagram of Fig. 10.

Specifically the resulting output obtained from mixer tube V148 of the "B" video blanking unit is represented by the waveform in Fig. 10D and the associated amplifier tube V162B previously referred to will be cut off at the corresponding negative sectors indicated in waveform 10(d). Therefore, at the time V162B is cut off, the remote responding signals from ground station "A" which are received in the ship-station receiver will be applied through cathode follower V163A to tube V161B (Fig. 3A) in the "A" blanking unit which, for the reasons previously described, will not be cut off at this time. Tube V161B accordingly amplifies and inverts the "A" ground-station signal and applies it through J102-11 to the right-hand deflection plate of the indicator tube V125 (Fig. 2) and the "A" ground-station signal is accordingly displayed on the left-hand portion of the tube.

Similarly, the output of mixer tube V147 of the "A" video blanking unit is represented by the waveform in Fig. 10E. That is, since the "B" ground station is arranged to transmit at a later delayed time period with respect to the "A" ground station, then the 4000-µs. sampling pulse from the corresponding "B" delay multivibrator 117a will create negative sectors in the output of V147 (Fig. 10E) which occur later than those represented in Fig. 10D. During such negative sectors, the tube V161B in the "A" video blanking unit 109 is cut off while, in this case, the corresponding tube V162B in the "B" blanking unit is not cut off. Since the operation of the "B" ground-station is synchronized with the "B" delay multivibrator in the ship-station, the received "B" ground-station signal will be applied by the ship-station receiver to V162B through cathode follower V163B. The resulting inverted signal is applied from V162B through terminal J102-10 to the left-hand deflecting plate of cathode-ray tube V125 (Fig. 2) and the "B" ground-station signals will accordingly be displayed in the right-hand portion of the display tube.

Accordingly, it will be apparent from the above discussion, that the described commutating arrangement produces sequential display of the "A" and "B" ground-station signals, together with the local ship-station signal alternately in the left- and right-hand portions of the display tube V125 respectively in a manner such that the "A" ground-station signal together with the local ship-station signal appears to the left while the "B" ground-station signal together with the local ship-station signal appear to the right of the vertical trace as indicated in Fig. 9B of the drawings.

The remainder of the mechanism shown in the block diagram of Fig. 1A and 1B mainly provides the referred-to distinguishable sweep circuits producing the vertical deflection sweeps for displaying the "A" and "B" ground-station signals together with the ship-station signal. The circuitry for producing such sweep effects will be described in connection with Figs. 1 and 3.

The purpose of the "A" and "B" range control units 107, 108 (Fig. 1A) together with their associated delay multivibrator and mixer circuits 116, 117 (Fig. 1B) is to provide selectively adjustable-according-to-time precision identifying signals which will control actuation of the vertical sweep in the visual indicator tube V125. As previously mentioned, the indicator tube V125 must display the "A" ground-station signals in the left-hand side of the vertical trace and the "B" ground-station signals on the right-hand side, together with the ship-station's own signal in each instance. The means (109, 111) for commutating the "A" and "B" ground-station signals to the left and right-hand portions of the display tube have already been described. The "A" and "B" range control units provide separate sweep controls for displaying the "A" and "B" signals separately and at distinct, precisely-defined delay periods, respectively; i.e., 3000 µs. for the "A" ground station and 8000 µs. for the "B" ground station. Briefly, to define such precise delay intervals, a series of groups of adjustable-according-to-time, 1000-µs. pulses are generated by the "A" and "B" range units, respectively. The number of such pulses which can "stand" on a pedestal of predetermined length will therefore obviously define a time period equal to a 1000-µs. multiple of the number of such pulses.

As is apparent from Figs. 1A and 1B, the 10-kc. output of the first divider unit 105a is applied concurrently through leads 105a-1, 105a-2 to the resolver unit 106 (Fig. 1A) in the controller unit and to the 100, 1000 µs. marker generator 112 (Fig. 1B) in the indicator unit. Similarly the 1-kc. output from the second divider stage 105b is applied through leads 105b-1, 105b-2 to resolver 106 and to a 1000 µs. marker 113 as well as to marker generator 112. The third divider stage 105c drives the fourth divider stage 105d which provides an output frequency of 1/12 kc. and is applied through 105d-1 to the bistable clock-pulse generator 114 and slow-sweep generator 115. Since the multivibrator 114 characteristically provides a division factor of 2, its output corresponds to a repetition rate of 41⅔ cycles per second as described.

The output signals generated by 114 are applied as previously indicated to the multivibrator 110 which triggers the "A" and "B" commutator circuits at a like repetition rate of 41⅔ times per second.

The controller 100 of the ship-station instrument includes the "A" and "B" range units indicated in Fig. 1A corresponding to the "A" and "B" ground stations, respectively. Each range unit is identical in construction and is supplied with a 100, 10, and 1 kc. clock signal from the referred-to stages of divider 105. Each range unit consists of a pulse shaper, mixer, and amplifier component such as 107 and an adjacent section of the two-section phase shifter or resolver unit 106 as indicated in Fig. 1A. That is, the "A" range unit comprises the "A" pulse shaper, mixer, and amplifier component 107 and the left-hand section of "A" resolver unit 106 while the "B" range unit includes the corresponding pulse shaper component 108 and the right-hand section of resolver 106. As will be described, the resolver consists of a plurality of phase shifters which can be adjustably actuated to shift the time-position of the ground-station display signals. Each range unit has a range corresponding to 1000 µs., but the range is extended by the proper selection of a group of 1000 µs. marker pips as will be described.

The range unit is illustrated as a whole in Fig. 9A as including a visual display scope V125 controlled by the two range knobs 130, 131 and identified as the "A"

and "B" range controls, respectively. The "A" range knob 130 is used to register the range from the ship-station to the first or "A" ground-station by manipulating the pattern appearing on the screen of display tube V125 to the left of the vertical trace line (see Fig. 9B). Similarly the "B" range knob 131 determines the range to the second or "B" ground-station as indicated by the displayed pattern to the right of the vertical trace line.

The resolver 106 shown in Fig. 1A includes two controllable sections which are designated as the "A" and "B" blocks defined by the vertical broken line in Fig. 1A. Each control unit in turn comprises three phase shifters 106a, 106b, and 106c defined by the horizontal broken lines in Fig. 1A. The phase shifters 106a, 106b, and 106c are supplied with 100-, 10-, and 1-kc. clock pulses, respectively, by the divider 105 which pulses, when combined following the phase shifters, function to move the referred-to "A" and "B" portions of the sweeps indicated in Fig. 9B so as to display and measure the ranges to the respective ground stations. The output of the range units consists of 1000-μs. pulses, movable through a 1000-μs. range. The three-phase shifters 106a, 106b, and 106c are mechanically coupled together and the phase shifters in each of the "A" and "B" range control units are connected to the "A" and "B" range knobs 130, 131 as shown in detail in Fig. 3 to be described.

The output signals from each of these units are applied to the referred-to pulse mixers 107 and 108, respectively. The mixer circuits are used to measure the respective distances between the ship station and each of the ground stations. In line with such manifest purpose, the mixer 107 corresponds to the "A" range unit while mixer 108 corresponds to the "B" range unit. Each section "A" and "B" of the resolver unit 106 corresponding to the "A" and "B" groups, respectively, are mechanically interconnected to preserve the correct ratios between their rotational speeds as indicated in the detailed diagram of the entire controller unit occupying Fig. 3A.

Each section ("A" and "B") of the resolver is operable or adjustable independently of the other through suitable mechanical control elements. Since the maximum range contemplated in connection with the present invention is 550 statute or 480 nautical miles, the referred-to mechanical control system for the resolvers is calibrated in divisions of 9,999.9 μs., a figure in excess of the practicable range limit of the instrument (i.e. corresponding to 6000 μs.). The vernier dials 130, 131 used to control the resolver are calibrated in 10-μs. units with subdivisions to one-tenth of a μs. as shown in Fig. 9A. Each dial is in turn connected to a direct reading Veeder-Root type of register 130a, 130b (see Fig. 9A) which directly indicates the range setting in 10's, 100's, and 1000's of μs.

Referring to the circuit schematic of the ship-station controller shown in Fig. 3, it will be apparent that the 100-, 10-, and 1-kc. clock signals obtained from the clock-pulse generator 104 and the various divider stages 105 are connected to the phase shifter or resolver portion 106a, 106b of both the "A" and "B" range units through tube V143. Inasmuch as the "B" range unit is identical in construction and operation as the "A" unit, the former is indicated only in block diagram form in Fig. 3B.

The "A" and "B" range units comprise the three referred-to phase shifters 106a, 106b, and 106c, the construction of only the "A" unit being detailed in Fig. 3. The phase shifters are mechanically geared together as indicated by the dotted lines to provide a 10:1 speed reduction between the 10 and 100 μs. and 100 and 1,000 μs. phase shifters. The referred-to 10-μs. range dial 130 is directly coupled to the 10-μs. phase shifter 106a and the range counter 130a is coupled to the shaft by a bevel gear drive. The 10-μs. phase shifter 106a is an Eclipse Pioneer type AY-251-24 while the 100 and 1,000-μs. phase shifters 106b and 106c are type AY-221-27. The former is designed for high-frequency phase resolution and consists of a single-phase stator 106a-1 which is energized by the 100-kc. signal as shown, and a two-phase rotor 106a-2 the windings of which are spaced 90 degrees apart. Resistors R105, R107, and capacitor C167 comprise a phase balancing network which converts the two-phase output from the phase shifter to single-phase form and the output phase can therefore be varied with respect to the single-phase input signal by adjusting the angular position of the phase shifter through the range knob 130. The remaining two phase shifters are similar in principle and construction except that they are designed for a lower frequency of operation. The stator as well as the rotor of the latter phase shifters has two 90-degree related coils. Each phase shifter varies the phase of the output signal with respect to the applied (100, 10, and 1 kc.) input signal.

As was explained in connection with the description of the block diagram in Figs. 1A and 1B, the output of each phase shifter is applied to a respective pulse shaper, mixer and amplifier 107 and 108. The phase shifter and mixer amplifier of the "B" range unit is identical to the "A" range unit, and the circuit details of the "B" unit are therefore indicated in block form only in Fig. 3B.

*Pulse shaper and mixer amplifier 107 (Fig. 3A)*

Referring to the "A" pulse shaper mixer 107 of the "A" range unit, the 100-kc. phase-adjustable output signal obtained from the resolver unit 106a is applied to tube V149A. The 10-kc. phase-adjustable output signal from resolver unit 106b is applied to tube V151 and the 1-kc. phase-adjustable output signal from resolver 106c is applied to tube V149B.

The phase-adjustable 10- and 1-kc. signals are combined with the adjustable 100-kc. signal in mixer tube V155 and an output signal is obtained from tube V159. Tube V149A (Fig. 3A) is an amplifier and is used to isolate the 100-kc. phase-adjusted signal from the load and is connected to mixer tube V155.

Tube V151 forms a pulse-shaping circuit for the 10-kc. phase-adjusted signal. The right-hand section of the tube is unbiased. During the positive portion of the applied signal, the grid is prevented from being driven positive by the 150 K. resistor in the grid circuit. The negative portion of the wave drives the grid down beyond cutoff, producing a square, positive output wave in the plate circuit. Capacitor C151 and resistor R169 function to differentiate the square pulse into positive and negative pips. The left-hand section of the tube V151 is arranged as a diode clamp which clips the positive pip and forms a grid bias for the mixer tube. The resulting output signal is applied as an input to the referred-to mixer tube V155.

Tube V149B is used as an amplifier working into tube V153, the pulse-shaping tube for the 1-kc. signals. The right-hand section of the tube V153 is self-biased so that only the positive peaks of the 1-kc. signal cause the tube to conduct, thus producing negative pulses approximately 150 μs. in length, in the plate circuit. The second half of V153 inverts this pulse and flattens the peak. The resultant output signal is applied to mixer tube V155.

The mixer tube V155 which receives the three above-described 100 kc., 10 kc. and 1 kc. signals and combines them, is biased so that the peak of all three signals derived from the phase shifters must be coincident in order for tube V155 to conduct. When the phase shifter has been properly adjusted by range knob 130 to secure coincidence between the local ship-station reference and ground-station responding signals manifested on the ship-station indicator tube V125, the relative phase of the three-phase shifter output signals will be such that they occur in coincidence; that is, once for each 1,000-μs. interval (as measured from the 1-kc. clock pulse). The tubes V157 and V159 amplify the phase adjusted output signal from V155 and the 1,000-μs. output pulses obtained from transformer T105 are applied through connector J102–5 to tube V133 (Fig. 2) comprising the "A" sweep mixer circuit 116 indicated in the block diagram of Fig. 1B. It may be parenthetically noted at this point that the same circuit action occurs for the "B" range unit including pulse shaper and mixer-amplifier 108 (Fig. 3B), the resulting output signal being applied through terminal J102–4 to the "B" sweep mixer 117 comprising tube V134 shown in Fig. 2B.

Attention may now be directed to the circuit schematic of Figs. 2A–2D as well as the block diagram of Figs. 1A, 1B for a description of the manner in which the phase-controllable pulses are employed to display the various station signals.

Referring to Fig. 1B, the delay multivibrator 116a associated with the sweep-mixer unit 116 provides a delayed control pulse for generating the sweep on which the "A" ground-station responding signals are displayed; the delay multivibrator 117a associated with the sweep-mixer unit 117 provides a delayed control pulse for generating the sweep on which the "B" ground-station responding signals are displayed and the delay multivibrator 118a associated with sweep-mixer 118 provides a control pulse for generating the sweep on which the local or ship-station reference signal is displayed. Since the "C" mixer unit 118 is connected to receive the 100-kc. clock pulse through lead 105a, its delay corresponds to zero time. The "A" and "B" delay units 116a and 117a are connected to receive the 41⅔ c.p.s. timing signal output obtained from multivibrator 114 through lead 114a while the "C" delay unit 118a is connected in opposite phase to the same source by lead 114b. The "A" and "B" delay units are consequently triggered 12,000-μs. intervals apart with respect to the delay unit 118a. The mixer circuit (116, 117, 118) associated with each ("A," "B," and "C") delay unit is used to generate pedestals of definite length on which a specific number of pulses will stand.

The number of pulses on each pedestal is determined by the pulse selector in each of the units 116, 117, and 118. The selector is arranged to exclude both the pedestal and all other pulses. The signals from the pulse selectors operate the "fast" sweeps on the indicator tube V125 on which the distance measurements are made. With such over-all description in mind, a detailed discussion of the construction and operation of the circuits involved follows.

The construction and operation of the referred-to delay multivibrators will be apparent by reference to Fig. 2. Referring specifically to Figs. 2A and 2B and following the over-all outline of Figs. 1A and 1B it will be apparent that the "C" delay multivibrator 118a comprising tube V112 shown at the bottom of Fig. 2B is triggered by a positive going square-wave pulse applied to the left-hand grid of V112 and derived from the plate of tube V115A comprising the previously described bistable clock pulse generator 114. Both the "A" and "B" delay multivibrators 116a and 117a comprising tubes V111 (Fig. 2A) and V114 in Fig. 2B are triggered by the leading edge of the positive clock pulse derived from the plate of V115B of the clock pulse generator 114 and applied to the left-hand grids of tube V111 and V114 respectively through conductor 114a. It will be apparent that, since the triggering pulse for the "C" delay multivibrator 118a (tube V112) is obtained from one side of the clock pulse generator 114 (i.e., the plate of V115A) and the triggering pulse for both the "A" and "B" delay multivibrators 116a, 117a (tubes V111 and V114) is obtained from the other side of the clock pulse generator 114 (i.e., the plate of V115B), the "A" and "B" multivibrators will be triggered 12,000 μs. with respect to the delay multivibrator "C" as described. Since all three of the referred-to delay multivibrators 116a, 117a, and 118a are similar in construction, only the circuit construction of the "A" delay multivibrator 116a will be specifically described.

Delay multivibrator 116a comprises the twin triode tube V111 shown in Fig. 2A. In its nonoperating state, the right-hand side of V111 is strongly conducting while the left-hand side is cut off because the right-hand grid is connected to the positive supply while the left-hand grid is connected to a lower potential source. The referred-to triggering pulse derived from the plate of V115B (Fig. 2B) is differentiated by the R–C circuit R131, C135 and applied to the left-hand grid of V111 to cause the left-hand side to conduct. The consequent drop in the respective plate voltage is reflected on the right-hand grid as a lowered potential which cuts off the right-hand side. Coupling capacitor C136 discharges through the plate circuit of the right-hand side of V111 and the resistor R133 in such a direction as to bring the right-hand grid to cause conduction. The delay produced by the multivibrator tube circuit V111 is therefore represented by the trailing edge of the square-wave signal output wave shown adjacent the plate in the right-hand section of V111 in Fig. 2A. Potentiometer R171 determines the time constant of the multivibrator circuit and therefore is employed to obtain precise adjustment of the required delay period.

It will be noted by reference to Fig. 1B, that the 1000-μs. marker generator 113 which comprises the tube V113B shown in Fig. 2A is connected through conductor 113a to the input of each of the described delay multivibrators 116a, 117a, 118a, and supplies 1000 μs. negative-going pulses to the left-hand side of each such multivibrator. The purpose of these marker pulses is to stop each multivibrator at a definite 1000-μs. interval or multiple thereof after it has been triggered by the clock-pulse generator 114. That is, since the "A" and "B" multivibrators 116a and 117a are triggered 12,000 μs. with respect to the "C" delay multivibrator 118a as above stated, assuming that tube V111 has been triggered by the described clock pulse so that the left-hand side is conducting, the first 1000 μs. pulse applied to the left-hand grid will merely be amplified and passed through coupling capacitor C136 to the right-hand side which is now at cutoff. The time constant provided by such capacitor is such as to require the application of a second and third 1000-μs. pulse (i.e. three 1000-μs. pulses in all) to the left-hand grid before the amplified effect thereof will be manifested at the right-hand grid to drive the right-hand side to its normal conducting state. In other words, the "A" delay multivibrator 116a will be triggered at 0 μs. and will remain flipped for a (3×1000) 3000-μs. period. Similarly the "B" delay multivibrator 117a comprising tube V114 in Fig. 2B will be triggered at 0 μs. and will be reset at an 8000-μs. period by the referred-to 1000-μs. marker pulses because of the indicated value of the coupling capacitor employed between the sections of tube V114. Since, the "C" delay multivibrator 118a is triggered at 12,000 μs. with respect to the "A" and "B" delay multivibrators, as described, it will be triggered at 12,000 μs. and remain conducting for 3000 μs. The "B" and "C" delay multivibrators 117a and 118a comprise the tube circuits V114 and V112 shown in Fig. 2B and their construction and operation is similar to the "A" multivibrator circuit 116a described in connection with tube V111 circuit.

The output from the "A" delay multivibrator 116a is applied through conductor 116a from tube V111 to tubes V133 (Fig. 2A) and V139A (Fig. 2B) comprising the "A" sweep mixer and pulse selector 116 identified in Fig. 1B. The output obtained from tube V159 (Fig. 3A) of the "A" pulse shaper in the "A" range unit 107 previously described is applied through connector J102–5 to the left-hand side of tube V133 (Fig. 2A). The plates of V133 are tied together and connected to a common plate load resistor and both sections of the tube are normally strongly conducting when no signal is applied to the tube. The application of the 1000-μs. phase-adjustable negative-going pulses obtained from the "A"

range unit 107 to the left-hand grid of V133 results in cutoff and the generation of positive pulses at the plate of the tube. The trailing edge of the pulse from multivibrator tube V111 of delay multivibrator 116A similarly results in cutoff of the right-hand section of tube V133 and the formation of the previously referred-to positive pedestal in the plate circuit. The length of the pedestal is determined by R–C circuit R127 and C137 as well as the pedestal control potentiometer R174. For normal operation, the pedestal is made 4000 µs. long. Any of the 1000 µs. pulses that occur coincidentally with the pedestal will cut off the left-hand side of V133 so that four of the 1000-µs. pulses (i.e., total duration of 4000 µs.) will "stand" on the pedestal as indicated by the waveform adjacent the plate of V133 in Fig. 2A. The position of these pulses on the pedestal is controlled by the adjustable phase shifter 106 (Fig. 1A) and the pulses are therefore adjustable along the length of the pedestal when the phase shifter is varied. It is thus apparent that the delay multivibrator and associated sweep mixer jointly operate to select the desired group of 1000-µs. pulses in the timing sequence. By selecting four sweep pulses, for example, as indicated, the instrument range may be made 3000 µs. (corresponding to the intervals between such pulses).

The "B" and "C" delay multivibrators and mixers 117a, 117, and 118a, 118 comprise the circuits including tubes V114, V134, V107B (Fig. 2B), V112 (Fig. 2b), V117, and V138b (Fig. 2D) respectively, and are generally similar in construction and operation to the described "A" delay-mixer unit 116a, 116. In connection with the "B" unit, the 1000-µs. pulses are derived from the "B" ranger 108 while in connection with the "C" unit, the 100-kc. clock pulses are superimposed on a shorter pedestal.

It will be noted that each of the sweep-mixer units 116, 117 and 118 include a pulse selector tube V107A, V107B, and V138B respectively. The purpose of the pulse selectors is to select the pulses that stand on the pedestal and exclude the pedestal and all other pulses. All three pulse selectors are identical, and only the "A" and "B" pulse selector circuit comprising tubes V107A, V107B will therefore be specifically described. The tube is cathode biased to a value that exceeds cutoff by an amount a little in excess of the pedestal voltage. Because of such bias, only the pulses on the pedestal will drive the grid up through cutoff and produce negative pulses in the plate circuit as indicated by the waveforms shown adjacent the tube in Fig. 2B.

Figure 4A:
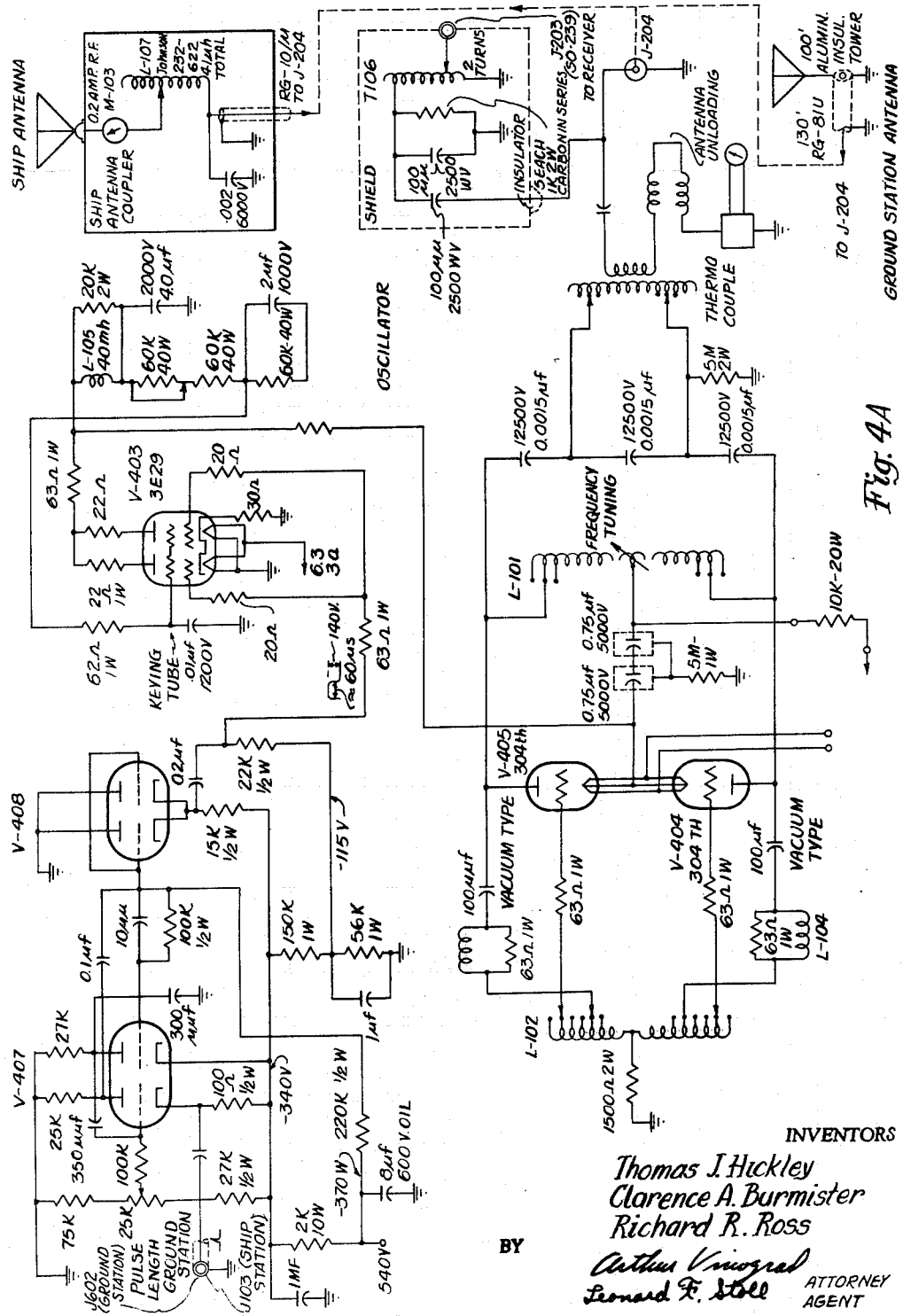
Fig. 4A is a schematic diagram showing the construction of the transmitter unit employed in both the ship-station and ground-station equipment.

The outputs from the "C" pulse selector 118 comprising tube V138B (Fig. 2C) is applied through conductor 138a to the transmitter trigger 121 (Fig. 1) comprising the tubes V136, V137 as shown in Fig. 2D. The output therefrom is obtained at terminal J103 for application to the ship-station transmitter (Fig. 4A). Specifically, the negative pulse obtained from the "C" pulse selector V138B is applied to V136 used as an inverter amplifier and cathode follower. Tube V137 is a thyratron which, when triggered, establishes a discharge path for C160 through transformer T107. A rapid positive pulse is then induced in the primary of the transformer for application to the transmitter and initiates the transmitter.

The outputs from the three mixers 116, 117, and 118, are also applied to the fast sweep generator 119 (Fig. 1B) comprising the circuit including tubes V119, V120, and V121 shown in Fig. 2D where the above-described 1000-µs. timing pulses are employed to govern the sequence in which the "A" and "B" ground-station signals are displayed. Specifically, it will be noted from Fig. 1B that the conductor 125 which represents the common output for the "A," "B," and "C" sweep mixer-pulse selector circuits 116, 117, and 118 contain the time-spaced pulse trains indicated in Fig. 2D adjacent the left-hand grid of tube V119. The first group of four, 1000-µs. pulses corresponds to the "A" ground-station sweep-display, the second group of four, 1000-µs. pulses corresponds to the "B" ground-station sweep-display and the third one, 1000-µs. pulse represents the "C" sweep display for the local ship-station reference signal. Since such pulses will initiate the fast sweep circuit 119 in a manner now to be described, it will be apparent that the vertical sweep cycles manifested on disply tube V125 will be sequentially energized in a like time sequence corresponding to said pulse groups. Such sequential control of the display patterns, in combination with the previously described left-right energization of the display tube results in the desired separate display in sequence of the "A" and "B" ground-station signals together with the ship-station signal.

The positive output pulse obtained from the left-hand plate of V119 consequent to the application of each of the negative-going 1000-µs. pulses applied to the grid through conductor 125 is applied to the right-hand side of tube V120 (Fig. 2D) and thence through conductor 120a to the left-hand side of intensity limiter tube V135 (Fig. 2C) which serves to intensify the visual indicator tube V125 during the fast sweep. The left-hand side of tube V120 and tube V121 comprise the fast sweep generator circuit. Pulses from the right-hand plate of V119 trigger the fast sweep generator. During its off period, the left-hand side of V120A is conducting and the condenser selected by switch S102b (Fig. 2D) is charged. When the multivibrator operates during the on-period, the left-hand side of V120 is cut off and the condenser starts to discharge through tube V121. Since V121 is a pentode, the current is uniform and a linear discharge results, producing, a linear saw tooth sweep voltage. Switch S102 also selects circuits which change the time-constant of the multivibrator to control the length of the sweep and, at the same time, select the proper value of charging condenser in the sweep circuit so that the sweep will be linear over most of its length. Potentiometer R202 in the cathode of V121 controls the discharge current therethrough, and partially controls the sweep speed.

The negative sawtooth signal from the sweep generator is applied to the paraphase amplifier 124 (Fig. 1) which, as shown in Fig. 2C includes tube V124. The paraphase amplifier is of conventional construction and is used to amplify and phase-split both the slow and fast sweeps. It has two outputs. The signals derived from each are the same shape but of opposite sign due to the equal resistors provided in the plate and cathode circuits of V124. The output from the paraphase amplifier provides the vertical deflection signal display sweep for the visual indicator V125.

It will be noted from Fig. 1B that the paraphase amplifier 120 which drives the vertical deflection plates of the indicator 125 may be connected to either a fast or slow sweep generator by the switching arrangement S101. The fast sweep is used during all normal ranging operations; the slow sweep being employed for "finding" the ground stations and in the performance of certain tests and calibrations. The slow sweep generator 115 is connected to the output of the last divider stage 105b and is therefore triggered every 12,000 µs. When the switch S101 is on the fast position, the amplifier 120 is connected to the output of the fast sweep generator 119 as indicated, the latter being triggered by the outputs from the previously described mixer circuits 116, 117, and 118.

*Slow sweep generator (115)*

The slow sweep generator 115 is provided as previously indicated for adjustment and calibration purposes. The slow sweep generator 115 consists of the portion of the circuit shown in Fig. 2D comprising tubes V122, V123. Gas tube V122 is triggered by the output from the fourth divider stage 105b and, upon conduction, discharges capacitor C211. Capacitor C211 charges through R264 to produce a sawtooth deflection signal which is amplified and inverted by V123 and applied through conductor 123a to the deflection plates of the visual indicator V125 through switch S101b and the paraphase amplifier 124 (Fig. 2C).

*10-μs. marker generator 122.*—As indicated in Fig. 1B, a 10-μs. marker generator 122 is provided for supplying test calibration marks to the oscilloscope trace. Such generator comprises the V116 tube circuit shown in Fig. 2A. The circuit consists of a conventional multivibrator which is triggered by a 100-kc. clock pulse, the output signal being applied through switch S104a to the deflection plates of V125.

*100-, 1000-μs. generator 112.*—The 100-, 1000-μs. marker generator 112 shown in Fig. 1 comprises the pulse generator tubes V104A, V113A shown in Fig. 2A. This generator mixes pulses obtained from the divider stages 105a and 105b at 10- and 100-μs. intervals, respectively and supplies them to the vertical deflection plates of the oscilloscope V125 for test purposes.

*1000-μs. marker generator 113.*—The 1000-μs. marker generator 113 previously described comprises the tube V113B (Fig. 2A) which is triggered by the output of divider stage 105b to provide 1000-μs. pulses for the "A," "B," and "C" delay multivibrators 116a, 117a, and 118a, previously described.

*Display tube:*—The display tube V125 is a conventional 5CP1 type oscilloscope having the usual bias and control circuits as detailed in Fig. 2C.

*Balance gain control 123 and receiver 102 (Fig. 5).*—The ship-station equipment also includes a receiver 102 for detecting the signals from the "A" and "B" ground-stations and applying them together with the local ship-station reference signal to the ship-station indicator system. Since the received ground-station and locally generated ship-station signals are seldom equal, the gain of the ship-station receiver must be varied during the time each ground-station signal is received. The circuits that produce such gain-switching are located in the indicator portion of the ship-station equipment and are adjusted by the balance gain control 123 (Fig. 1B).

The balance gain control 123 comprises the circuitry including tubes V118, V139A, and V139B as detailed in the ship-station indicator diagram (Fig. 2B). The outputs from the "A" and "B" delay multivibrator tubes V111, V114, are applied to the grids of V139A and V139B, respectively and the resulting positive square-wave signals are applied to the grids of the twin triode V118 shown in the upper right-hand portion of Fig. 2B. Tube V118 is employed as a cathode follower and the two "A" and "B" outputs are applied through terminals J102-8 and J102-7 to the "A" and "B" blanking video units 109 and 111 as previously described in connection with the description of the video blanking circuits.

As indicated in Fig. 2B, an adjustable potentiometer is connected between the cathode circuits of V118 and provides an output signal which is applied through terminal J102-6 to the ship-station receiver 102 as indicated in Fig. 1A. Such construction provides an adjustment feeding controllable amounts of either "A" or "B" pedestal voltage to the balance gain cathode follower tube V308 in the ship-station receiver and thereby serves to decrease the gain of the receiver during receptions of an "A" or "B" ground-station signal. The ground-station signals received at the ship-station are almost always unequal in strength. The stronger of the two signals is reduced by adjusting the referred-to balance gain control until equalization of the two signals is obtained. The combined control effect obtainable through adjustment of the receiver gain, local signal gain and balance gain controls, enables the amplitudes of the ship-station and ground-station signals to be equalized. In this manner the leading edges of the signals are made parallel thus facilitating coincidence matching in making range measurements. Specifically, the receiver gain is made to remain at a fixed level while the ship-station signal is being received. The video signal derived from the ship-station receiver 102 (Fig. 1A) is applied from terminal J104 (see Figs. 5 and 1A) to the double triode tube V163 (Fig. 3B) each half of which, respectively, is connected to the described two-channel blanking video unit 109 and 111 in the ship's controller unit. The output from the two-channel blanking unit is applied through leads 109a and 111a (Fig. 1A) to the horizontal deflection plates of the visual display tube V125 (Fig. 1B) as previously described. In this manner each channel is alternately blanked (due to the commutating action previously described) while the opposite channel is furnishing a signal to the indicator tube. Thus the local ship-station signal appears alternately on each side of the vertical trace on the indicator tube V125. Similarly, the "A" and "B" ground-station signals, when received, are also alternately blanked and unblanked in the video blanking circuits 109 and 111 so that the "A" ground-station signal will always appear on the left side of the indicator scope and the "B" ground station on the right side. Since the sweep is vertical, the video signals will be manifested in a horizontal direction and the ship signal will stand out from each side of the vertical trace line and be symmetrical about this line as indicated by the typical pattern display illustrated in Fig. 9B.

The receiver 102 is a broad-band double-detection (superheterodyne) type unit having an R-F stage, mixer, three intermediate-frequency stages, a detector and video amplifier. The receiver circuit is completely detailed in Fig. 5 and sufficient information is contained therein to make its construction and operation self-evident as required by the patent statutes. No detailed description of such circuitry is therefore considered necessary. The receiver employs a 2900-kc. local oscillator and an intermediate frequency of 1050 kc. The receiver used in both the ship-station and ground-station instruments is identical in principle and is exemplified in the circuit diagram of Fig. 5. The labeling adjacent the various terminals in Fig. 5 indicates the proper connections to the respective ship- and ground-station components.

*Electronic attenuator 120 (Fig. 4B).*—As indicated in Fig. 1A, an electronic attenuator 120 is provided between the receiver 102 input and the antenna coupler 126 to amplify weak ground-station signals, to attenuate the local ship-transmitted signals and to equalize the local signals with the received ground-station signals. The attenuator comprises an amplifier which functions during the time of reception of the ground-station signals and is turned off during the time the local signal is being transmitted.

The attenuator construction for both a ship-station and ground-station installation is identical and is detailed in the circuit diagram illustrated in Fig. 4B. The labeling shown in Fig. 4B adjacent the input terminal indicates the manner in which the attenuator is connected to the ship- and ground-station instruments respectively. Sufficient details are contained in the diagram to make its construction and operation apparent. It will be noted from Fig. 1 that the 41⅔ c.p.s. repetition pulses from the multivibrator 114 provide clock-timed-blanking pulses to the attenuator. Since such blanking pulses correspond to the described commutator arrangement, it will be apparent that the attenuator amplifier will be turned off during the time the local signal is being transmitted through the ship's transmitter 103. That is, the electronic attenuator's amplifier is blanked by the 41⅔ c.p.s. gating signal during the time the ship-station signal is transmitted so as to attenuate the local signal.

*Ship-station transmitter (Fig. 4A).*—The transmitter 103 shown in Fig. 1A is detailed in Fig. 4A of the drawings. The circuit details of the transmitter employed at the ship- and ground-station instruments respectively are similar. Accordingly, the transmitter shown in Fig. 4A can be used with either instrument, the labeling indicating the manner in which the transmitter is connected in each instance. The transmitter comprises a push-pull oscillator V404, V405, the cathode of which is biased to cut off during the periods of no signal. The keying tube V403 is biased beyond cutoff between signals but conducts strongly when driven by a signal from the modulator. The modulator V407, V408 is triggered by a signal from either J103 (Fig. 2) for the ship station or J602 (Fig. 7) for the ground station as indicated by the labeling in Fig. 4A. In the case of the ship station, for example, the triggering signal consists of the output from the "C" mixer circuit 118 shown in Fig. 1 as previously set forth. The reduction in bias on the oscillator tubes V104, V105 consequent to a signal from the modulator produces oscillations so long as the keying tube V103 conducts. The pulse generated in the transmitter has a rise time of 2.5 μs. and a duration time of about 60 μs., and a peak-pulse power of about 10 kw. under full voltage conditions. The power output is sufficiently strong to serve satisfactorily for the referred-to 500-mile range contemplated.

Summary of operation, ship-station instrument

The operation of the above-described ship-station instrument may now be briefly summarized with particular emphasis to the manner in which the desired objectives are secured. These immediate objectives are: (1) to sequentially display the "A" and "B" ground-station responding signals on opposite sides of a display tube together with the local ship-station reference signal; (2) to provide means for matching of the received ground-station signals with the ship-station signal in order to measure the ranges between the mobile and each ground station, and (3) to transmit a ship-station signal in proper time sequence to the ground stations.

The multivibrator 114 shown in Fig. 1B is triggered by the ½ kc. output signal provided by the divider stage 104d and provides an output clock pulse occurring 41⅔ cycles per second (12,000-μs. interval). Such clock signal is employed to commutate the received "A" and "B" ground-station signals so that each may be alternately displayed in proper time sequence. Specifically, multivibrator 114 triggers the second multivibrator 110, controlling the "A" and "B" video blanking circuits 109, 111 in the proper sequence so as to alternately energize the left- and right-hand sides of the visual display tube V125. Since the video blanking units also receive the output from the ship receiver 102, which in turn is gated by the same 41⅔ cycles/sec. clock pulse, the received "A" and "B" ground-station signals are sequentially displayed every alternate 12,000-μs. period. The ship-station instrument, in addition, must provide sweep means to properly display the "A" and "B" video signals in connection with the ship-station or "C" signal.

The necessary display sweeps are obtained in the following manner. In general, precise time intervals are defined by determining the number of 1000-μs. pulses which can stand on a pedestal of predetermined length. The three-phase shifters or resolver units associated with the "A" and "B" range units respectively function to vary the phase of the range unit output signals with respect to the applied 100-, 10-, and 1-kc. input signals obtained from the precision oscillator 104 and divider 105. These three-phase adjustable output signals are then applied to respective pulse shaper tubes located in the units 107 and 108. The pulse shaper (V151) to which the 10-kc. signal is applied converts the 10-kc. signal into a negative pulse which is applied to a mixer or signal gating tube (V155) common to all three of the signals. The 1-kc. signal is similarly applied to a pulse shaper tube (V149B) which produces a 100-μs. negative pulse. Such pulse is also applied to the common gating tube. The 100-kc. signal is applied to the common gate (V155) without shaping.

The common gating tube (V155) to which the last described three signals are applied functions as a coincidence gate and will conduct when and only when all three of such signals are coincident. Such condition of coincidence occurs only when the referred-to resolvers are adjustably positioned, by suitable calibrated range control knobs 130, 131, until the observed "A" and "B" ground-station signals appearing on the display tube are each matched with the local or ship-station reference signal ("C" signal). That is, when matching of the wavefronts of such signals is obtained, the relative phase of the three referred-to signals is such that they occur in coincidence (once for each 1000-μs. interval as measured from the 1-kc. pulse).

A similar arrangement of resolvers, pulse shapers, and a common gating tube is provide for the "B" range unit and the out-put of each such gate is applied to the respective "A" and "B" sweep mixer circuits 116, 117. Each such mixer is operated by a respective delay multivibrator 116a, 117a which is triggered by the referred-to multivibrator 114 representing the source of 41⅔ c.p.s. clock pulses. The "A" and "B" delay multivibrators are connected to opposite sides of the multivibrator 114 and hence are triggered 12,000 μs. apart in time with respect to the "C" delay multivibrator 118a. Each delay multivibrator also receives from marker generator 113, 1000 μs. timing pulses which are used to turn off each delay multivibrator at different periods of time. Accordingly, the "A" delay multivibrator 116a is energized for a 3000-μs. interval to provide a 3000 μs. delay period while the "B" delay multivibrator 117a is energized for an 8000-μs. interval and provides an 8000 μs. delay period. The "C" delay multivibrator 118a is turned on 12,000 μs. later with respect to both the "A" and "B" multivibrators and remains conducting for 3000 μs.

It will now be apparent by reference to Figs. 1A and 1B, that the "A" sweep mixer 116 receives a series of negative 1000 μs. adjustable-according-to-time pulses from the controllable "A" range unit, and the output of the "A" delay multivibrator 116a. The "A" sweep mixer generates a positive pedestal of 4000 μs. duration on which is superimposed four of these 1000 μs. time-adjustable pulses from the range unit. Similarly, the "B" sweep mixer 117 produces a pedestal which supports four of the time adjustable 1000-μs. pulses from the "B" range unit. The "C" sweep mixer 118a produces a short pedestal supporting a single 1000-μs. pulse representing zero time.

The output of each such mixer circuit is connected to a respective pulse selector (116, 117 or 118). The "A" pulse selector 116 excludes the pedestal and all pulses except the referred-to superimposed four, 1000-μs. pulses. Similarly, the "B" and "C" pulse selectors 117, 118 produce 4 and a single 1000-μs. pulse, respectively. That is, a train of pulses comprising a first group of four, 1000 μs. "A" pulses, a second group of four, 1000-μs. "B" pulses and a single 1000 μs. "C" pulse is applied to the fast sweep generator 119. The "C" pulse corresponding to the local ship-station reference pulse is invariable and determines the sweep for displaying the local ship-station reference signal. The "A" pulse group comprising the first four 1000 μs. adjustable-according-to-time pulses can time-positioned relative to the "C" or marker pulse by the control knob 130 associated with the "A" range unit. The "B" pulse group comprising the second four 1000 μs. adjustable-according-to-time pulses can be time-positioned relative to the "C" marker pulse by control knob 131 associated with the "B" range unit.

Since the "A" pulse group provides the sweep pattern for displaying the "A" ground-station signals, adjustment of the "A" range unit knob 130 will enable the wavefronts of the "A" ground-station signal and the local ship-station reference signal to be matched. Similarly, since the "B" pulse group provides the sweep pattern for displaying the "B" ground-station signals, adjustment of the "B" range unit knob 131 produces matching between the wavefronts of the "B" ground-station and the local ship-station reference signal.

In addition, the "C" pulse is used to trigger the ship-station transmitter which sends a signal to each of the remote "A" and "B" ground stations. The multivibrator 114 also furnishes timing pulses for energizing the electronic attenuator 120 in proper sequence to equalize the ship-station transmitted signals to a level commensurate with the received ground-station signals.

In accordance with the previous discussion, it will be apparent that the sweep establishing the local ship-station ("C") signal defines a zero reference time with which the received "A" or "B" ground-station signal can be compared as a result of the above described wavefront matching. That is, the time difference measured by such matching procedure is proportional to the time of travel of a signal transmitted from a corresponding ground station to the ship station and hence is a measure of the range between the ground and ship station.

In a manner now to be described, each of the "A" and "B" ground stations are arranged to transmit a responding signal at a different delay interval with respect to the ship-station signal and in this manner, the respective ground station signals can be readily identified at the ship-station without ambiguity.

*Ground station instrument (Figs. 6 and 7)*

There are two principal functions of the ground-station instrument: (1) to receive a radio-frequency inquiry pulse from the ship or mobile station, and (2) to transmit the signal back to the ship-station on the same frequency and after a definite time delay period which differs for each of the ground stations. Each of the "A" and "B" ground stations employed with the system of this invention are identically arranged and include (1) a controller-indicator, (2) a receiver, and (3) a transmitter. Since many of the components employed in the ground-station instrument are identical or very similar in construction to the ship instrument, it will be sufficient to describe much of the ground-station equipment by reference to the previously described corresponding components in the ship station.

The block diagram of each ground-station instrument is shown in Fig. 6 and generally includes a controller-indicator comprising the main portion of Fig. 6, a receiver 627 and transmitter 625. The receiver and transmitter units are essentially the same as those employed in the ship-station instrument as detailed in the circuit diagrams of Figs. 4 and 5 while the controller-indicator circuit is detailed in the circuit schematic comprising Figs. 7A–7D which taken together form a single circuit diagram. Accordingly, reference will be made concurrently to the block diagram of Fig. 6 and the detailed circuit diagram of Figs. 7A–7D in describing the ground-station equipment. The various timing signals and waveforms involved are indicated in the timing diagram of Fig. 11.

The ground-station indicator-controller block diagram shown in Fig. 6 will be briefly surveyed and a detailed description of the construction and operation of the ground-station instrument will follow.

The timing of the ground-station system is controlled by a 100-kc. crystal oscillator 601 forming part of the controller-indicator unit detailed in Fig. 7. The output of the crystal generator is applied to a chain of step-divider circuits 603a, 603b, 603c, through a squaring amplifier 602. The divider chain stages provide divisional factors of 5, 10, 4, and 6 for the applied 100-kc. signal. Since the output of the squaring amplifier 602 provides pulses at 10-μs. intervals, the intervals between pulses obtained from each of the divider stages are 50, 500, 2000 and 12,000 μs., respectively as indicated in the diagram of Figs. 7A and 7B. The output signal of each divider stage is also represented by the waveforms in Figs. 11B–11E.

The 12,000-μs. output pulses of the last divider stage 603c are applied to a square-wave generator 615 through a pulse clipper 616. The clipper applies 12,000 μs. pulses of opposite phase to the two inputs of square-wave generator 615. Accordingly, pulses 12,000 μs. apart in time (see Fig. 11G) are applied to the "A" and "B" delay multivibrators 611, 614 through conductors 615a, 615b, respectively.

It is important to observe at this point in the description that the "A" delay multivibrator 611 provides the same fixed delay period whether employed in connection with the instrument in either the "A" or "B" ground station. The "A" delay multivibrator is initiated at the beginning of each 12,000 μs. half period and, as will become apparent, remains conducting for a 1000 μs. period as shown by Fig. 11J to ultimately provide a sweep control pulse which occurs at a 1050 μs. period measured from the beginning of the referred-to 12,000 μs. half period and as indicated in Figs. 11K and 11L. The "B" delay multivibrator 614, however, is arranged to provide a different delay period depending upon whether it is located in an "A" or "B" ground-station instrument. If located in an "A" ground-station instrument, it is triggered at the end of the same referred-to 12,000 μs. half period and is terminated 2000 μs. later as indicated in Fig. 11M to ultimately provide a delay interval of 2050 μs. as shown in Figs. 11N and 11(O). On the other hand, the "B" multivibrator 614, when located in a "B" ground-station instrument will also be initiated at the end of the same 12,000 μs. half period, but in this case, will remain conducting for a 7000 μs. interval as indicated in Fig. 11M to ultimately produce a sweep control pulse which occurs at a 7050 μs. delay interval as indicated in Figs. 11N and 11(O). The 1050 μs. or 7050 μs. delay control pulse initiates the sweep in each respective "A" or "B" ground-station instrument for displaying the corresponding local "A" or "B" ground-station signal as the case may be.

It will be noted from the above discussion, that if the beginning of each 12,000 μs. half period is assumed to correspond to zero time, then 12,000 μs. minus 1050 μs. plus 2050 μs. exactly equals 13,000 μs. which is the delay period characterizing an "A" ground station. Similarly, in connection with a "B" ground station, 12,000 μs. minus 2050 μs. plus 7050 μs. exactly equals 18,000 μs. which is the delay period characterizing a "B" ground station. The construction and operation of the apparatus for achieving the above outlined objectives will be more completely described in the portions of the description following, it being significant at this point to observe the significance in providing separate, distinguishable delay periods for each respective ground station.

The clock pulses from the "A" delay multivibrator 611 are applied to a mixer 633. The mixer also receives 50 μs. clock pulses from stage 603a of the divider chain and the output of the mixer is applied to one-half of a two-section pulse selector 607. In this manner a 50-μs. duration pulse is selected every 24,000 μs. and is used to key the circuit of the fast sweep for the ground-station display tube V625, on which the video signals from the ship-station are displayed.

The output of the "A" delay multivibrator 611 is also applied through lead 611a to a synchronizer 637. The synchronizer initiates a sequence of events providing an adjustable time delay represented in Fig. 6 by knob 612a which permits the operator at the ground station to match the leading edges of the remote ship-station reference signal with the local ground-station signal on the display tube V625. The synchronizer also provides a D.C. error voltage which is used to stabilize the frequency of the clock-pulse generator 601 to that of the ship-station through an AFC network 636.

The "B" delay multivibrator 614 is connected to a "B" mixer 634 and to the second half of the two-section pulse selector 607. In this manner a 50-μs. pulse is selected each alternate 24,000-μs. period (with respect to the corresponding "A" pulse) and is used to key two channels as follows: (1) the fast-sweep circuits of the display tube V625 on which the ground-station signals are displayed, and (2) the transmitter trigger circuit 636a, the output of which keys the pulse-shaping circuits in the transmitter modulator.

In other words, the "A" delay multivibrator circuit 611, 633 etc. is employed to display the remote ship-station reference signal when received at the ground station on the ground-station display tube while the "B" delay multivibrator circuit 614, 634 etc. functions to display either the "A" or "B" ground-station local signals (depending on the particular ground station employed) on the ground-station display tube in matched relation with the remote ship-station signal.

The display tube V625 in the ground-station instrument employs a horizontal sweep and the range signals are displayed vertically as shown in Fig. 9C. Only the ground-station signal of the ("A" or "B") ground station concerned is displayed at each respective ground station. As will be described, each local ground-station signal must be attenuated before being displayed in order to be commensurate with the received ship-station signal. While the ship- and ground-station signals differ slightly in shape, the leading edges are essentially similar and can therefore easily be matched.

*Clock-pulse generator 601.*—The clock-pulse generator 601 comprises the circuit including tube V601 shown in the upper left-hand portion of Fig. 7A. The circuit comprises a 100-kc. crystal oscillator, the frequency of which may be stabilized by an AFC circuit 636 comprising tube V636A. The 10-µs. pulses comprising the output of the oscillator is represented in Fig. 11A. The slug tuned variable inductance L601 can vary the frequency of the tuned circuit over a considerable range. The inductance is coupled through capacitor C622 to the plate of the automatic frequency control tube V636A. The grid of V636A receives the previously referred-to D.C. error signal derived from the synchronizer 637 to be described. As is conventional in such arrangements, the variations in conduction of the tube V636A consequent to changes in an applied error signal is reflected as an impedance change in the series circuit including the referred-to capacitor C622. Such series combination is connected in parallel with the crystal resonating circuit of oscillator tube V601. These impedance variations are reflected as phase angle changes and hence control the frequency of oscillation. The error voltage applied to V636A is always in the proper direction to correct the frequency drift to a value coincident with the frequency of the ship station.

*Frequency divider 603.*—The frequency divider 603 indicated in the block diagram of Fig. 6 comprises the stages 603a, 603b, 603c, and 603d which includes the circuits comprising the respective tube pairs V603—V604A, V605—V606A (Fig. 7A), V608—V606B, and V609—V610A as shown in Fig. 7B. These divider stages are essentially similar, except as to specific divisional factors, to the ship-station dividers 105 described in connection with Figs. 1 and 2 and no further description is considered necessary. Moreover, since much of the circuitry employed in the ground-station instrument is similar in construction and operation to the components of the ship equipment already described, only brief reference of the operational relationship of the various ground-station components need be detailed at this point. The clock pulses comprising the outputs of divider stages 603a, 603b, 603c, and 603d, are represented in Figs. 11B, 11C, 11D, and 11E as having time intervals of 50-, 500-, 2000-, and 12,000 µs., respectively.

Figure 7C:
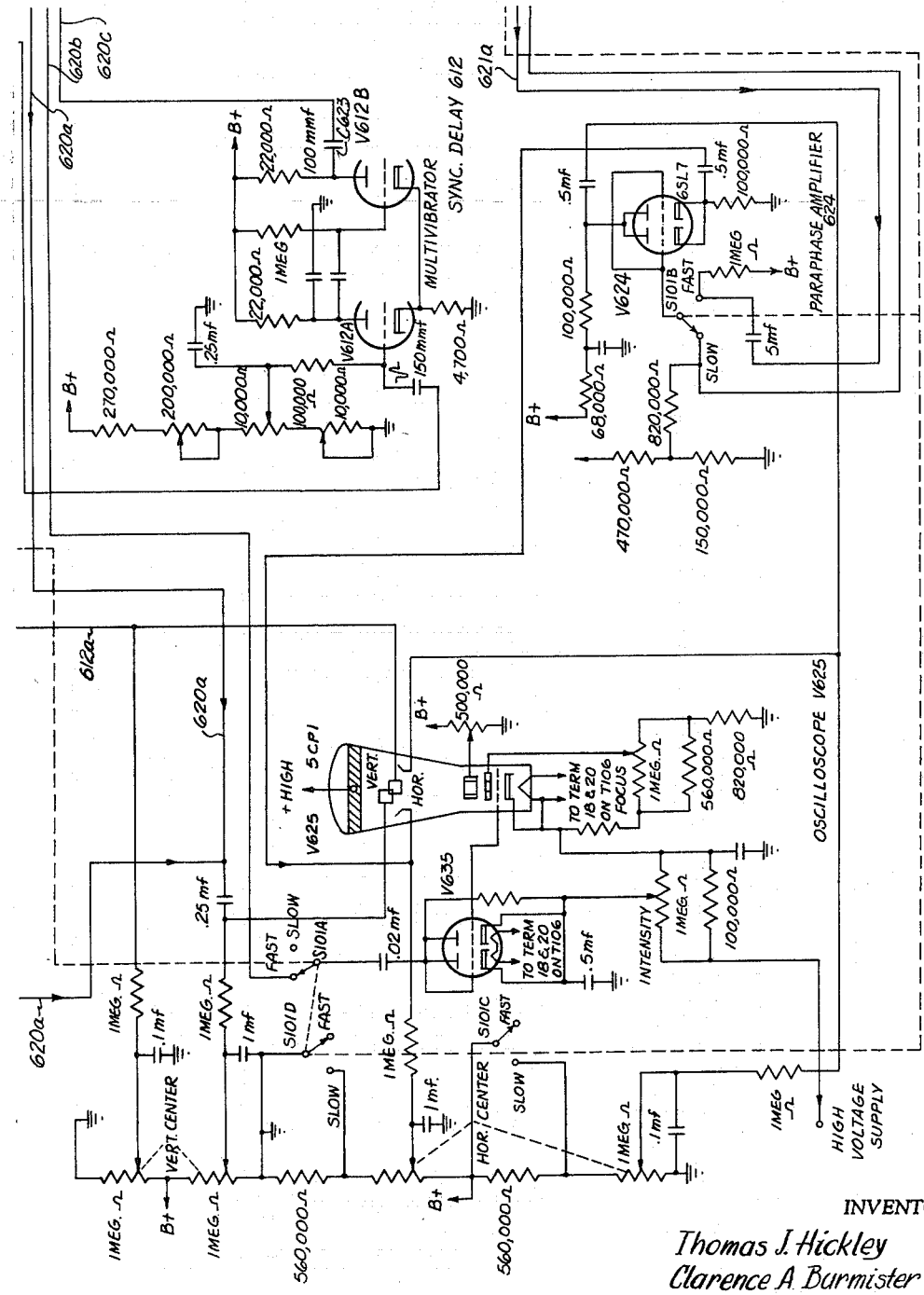

*Slow-sweep generator 622.*—The slow-sweep generator 622 and amplifier 623 shown in Fig. 6 comprise the circuitry including tubes V622, V623, in Fig. 7D. The sweep generator 622 is triggered by the 12,000 µs. output from the last divider stage 603d (Fig. 7B) applied to the grid of V622 (Fig. 7D) and its output is applied through amplifier V623 to the horizontal deflection paraphase amplifier 624 (Fig. 6) comprising tube V624 in Fig. 7C. The input to the slow-sweep generator 622 is represented by timing waveform (e) in Fig. 11 and the output is represented in Fig. 11B.

Returning to the referred-to "A" and "B" delay multivibrator circuits 611 and 614, described in connection with Fig. 6, each such circuit as detailed in Figs. 7A and 7B comprises a double triode such as V611A and V611B (Fig. 7A) in the case of the "A" circuit and V614 (Fig. 7B) representing the "B" circuit. Each double triode is connected as a monostable multivibrator. Referring to Fig. 7B of the drawings, it will be seen that pulse clipper tube V610B receives 12,000 µs. pulses (Fig. 11E) from the output of fourth divider stage 603d (tube V610A) and pulses of opposite phase as derived from the plate and cathode of V610B are then applied to the respective grids of tubes V615A and V615B comprising the square-wave pulse generator 615. The two outputs obtained from square-wave generator 615 are represented by waveform (g) in Fig. 11. In this manner, pulses which are 12,000 µs. apart in time (i.e., opposite in phase) are generated and applied through conductors 615a and 615b, respectively to the "A" and "B" ground-station delay multivibrators 611 and 614 comprising the circuits associated with tubes V611 and V614 respectively shown in Figs. 7A and 7B. Suitable differentiating circuits are associated with the input to each multivibrator and the input to delay multivibrator 611 is therefore represented as waveform (i) in Fig. 11. The "B" delay multivibrator input is similar but of opposite phase.

In order to turn off the "A" and "B" delay multivibrators at a precise interval after they have been turned on and thereby provide the required "A" and "B" delay intervals, negative pulses, 500 µs. apart are supplied by a clock-controlled 500-µs. marker generator 613 to both the "A" and "B" delay multivibrators. As shown in Fig. 7A, the 500-µs. marker amplifier 613 consists of tube V613A the cathode of which is coupled to the output of the second divider 603b which is a 500-µs. pulse as previously stated. The output from the plate of V613a is applied to the left-hand grid of each delay multivibrator tube V611 (Fig. 7a) and V614 (Fig. 7b). The 500-µs. pulses are indicated as markers superimposed on the waveform input to delay multivibrator 611 in Fig. 11(I).

Remembering that the "A" and "B" delay multivibrators are each turned on 12,000 µs. apart in time, the effect of such 500 µs. extinguishing pulses is to cut off the delay multivibrators at a precise 500-µs. interval. Specifically, the input grid of the "A" delay multivibrator V611A is connected to an adjustable "remote signal delay control" potentiometer R129 while the input grid of the "B" delay multivibrator tube V614 is connected to a "sync" or "station-delay control" potentiometer R171. In this manner, because of the respective time constants involved, the output of the "A" delay multivibrator 611 is limited by the second applied 500-µs. pulse and is therefore of 1000 µs. duration as indicated by the waveform in Fig. 11J. The output of the "B" delay multivibrator 614 is initiated 12,000 µs. later as shown in Fig. 11M and is terminated by either a fourth or fourteenth 500-µs. pulse depending on whether it is part of an "A" or "B" ground-station instrument and therefore may be either of 2000 µs. or 7000 µs. duration as the case may be.

The time constant of the "A" delay multivibrator circuit 611 is such as to provide a 1000 µs. delay period regardless of whether it is located in an "A" or "B" ground-station instrument. The "B" delay multivibrator 614, however is provided with a different time constant as above stated so as to provide a different, distinguishable delay period depending on whether it is used in connection with an "A" or "B" ground-station instrument.

In other words, as indicated in Fig. 11M the duration of the output signal of the "B" delay multivibrator 614 is 2000 μs. when the multivibrator forms part of an "A" ground-station instrument and the width of the delay signal is increased to 7000 μs. when it is employed in a "B" ground-station instrument.

The "A" and "B" delay mixers 633 and 634 (Fig. 6) are each connected to receive the outputs of the respective "A" and "B" delay multivibrators 611, 614 and are further operated by 50-μs. clock-pulse obtained from the first divider stage 603a as shown in Fig. 6. Referring to the corresponding circuits in Fig. 7, the "A" and "B" mixer circuits comprise the double triodes V633 (Fig. 7A) and V634 (Fig. 7B). Each mixer comprises a double triode having its plates tied together to a common load and hence both sections are normally conducting. The first or left-hand grid of V633 receives the referred-to 50-μs. negative-going pulses provided by stage 603a of the divider and the left section of the tube is consequently driven to cut off during such 50-μs. intervals. The positive pulses thereby induced in the plate of the left-hand section are mixed with the still negative output from the right-hand section of V633. The right-hand grid of V633 is connected to receive the negative differentiated pulse of the waveform produced by the "A" delay multivibrator tube V611 (Fig. 7A). See also Fig. 11J. Since the multivibrator circuit comprising tube V611 has a maximum pulse duration of 500 μs., the time constant of the circuit comprising R627 and C637 is selected so as to provide a 75-μs. positive pulse at the right-hand plate of V633 as indicated in Fig. 11K. Accordingly, the combined output of V633 consists of a pedestal pulse superimposed with a 50-μs. marker as indicated by the waveform shown adjacent the grid of tube V607A in Fig. 7B. As indicated in Fig. 11K, such 50-μs. marker will therefore occur at a 1050-μs. interval from the start of a cycle.

The construction and operation of the "B" mixer 634 is similar. The "B" mixer tube V634 responds to the output of the "B" delay multivibrator, the waveform of which is shown in Fig. 11M and therefore produces an output concurrently with the trailing edge of such "B" delay pulse. Such output consists of a 75-μs. pedestal superimposed with a 50-μs. pulse. The output of the "B" mixer for an "A" ground-station instrument therefore occurs at an over-all delay period of approximately 13,000 μs. while the output of the "B" mixer when used in a "B" ground-station instrument occurs at an over-all delay period of approximately 18,000 μs. as indicated in Fig. 11. These respective delay periods provide a means for distinguishing the "A" and "B" ground-station signals in order that precise, unambiguous range measurements between the mobile and each ground station may be obtained at the mobile station.

The output of each mixer is applied to a two-section pulse selector 607 as indicated in Fig. 6. The pulse selector 607 as detailed in Fig. 7B includes a double triode V607A and V607B each section corresponding to the "A" and "B" mixer, respectively. The output (waveform Fig. 11K) of the "A" mixer V633 (Fig. 7A) is connected to the grid of pulse selector tube V607A (Fig. 7B) while the output (waveform Fig. 11N) of the "B" mixer 634 (Fig. 7B) is connected to the grid of pulse selector tube V607B. The pulse selector tube sections are self-biased as shown to a value slightly exceeding the sum of the tube cutoff and the amplitudes of the referred-to pedestals. Therefore, the only pulse that exceeds such value is the referred-to 50-μs. pulse superimposed on the pedestals in the plate outputs of each of the mixers 633 and 634, and symbolized by the waveforms shown adjacent the grids of tube sections V607A, V607B in Fig. 7B. Therefore the pulse selector tube sections V607A or V607B will conduct only in timed relation to such 50-μs. marker pulses and will deliver corresponding negative pulses at like 50-μs. intervals, respectively.

As long as the 50-μs. pulse remains on the pedestal, all timing events in the circuits controlled by this pulse will have the high precision of the pulse and value changes in divider chains or delay circuit components will not alter timing. The output waveform derived from section V607A of the pulse selector as indicated in the timing diagram (Fig. 11(I)) is therefore a negative pulse occurring at a 1050-μs. period and also corresponds to the input to pedestal generator 619 (tube V619 in Fig. 7D) as indicated by waveform (p) in the timing diagram of Fig. 11.

The output waveform derived from section V607B (Fig. 7B) of the pulse selector as shown in the timing diagram (Fig. 11(O)) may occur at either of two delay intervals depending upon whether an "A" or "B" ground-station instrument is concerned. That is, the "B" pulse selector at an "A" ground station will provide a negative marker output at a 13,000-μs. delay period while the "B" pulse selector located in a "B" ground-station instrument will provide a negative output signal at an 18,000 μs. delay interval.

The 50-μs. pulse from the "A" pulse selector is used to key a fast sweep for displaying the remote ship-station signal while the output from the "B" pulse selector is used to display either the local "A" or "B" ground-station signal as the case may be on the "A" or "B" ground-station display tube V625.

Specifically, the output of the "A" and "B" pulse selector 607 (Fig. 6) is applied through lead 607a to pedestal generator 619 for subsequent application to the indicator tube V625. A second output of the pulse selector is applied through lead 607b (Fig. 6) to the transmitter trigger 636a. The transmitter trigger circuit 636a shown in the block diagram of Fig. 6 provides a positive pulse to the modulator portion of the ground-station transmitter to key the transmitted R-F pulse. The transmitter trigger is further detailed in Fig. 7B and is shown as comprising an amplifier inverter V636B and a triggering stage V617. The negative pulse derived from the "B" pulse selector V607B is applied through conductor 607b to the grid of V636B as shown in Fig. 7B. Amplified positive pulses are thereby obtained and applied to the control grid of the thyratron tube V617. The trigger tube V617 thereupon conducts heavily, drawing current through capacitor C639 which is in the primary of output transformer T607. The transformer secondary is phased so that a positive pulse will be supplied to the modulator of the transmitter (which is detailed in Fig. 4A) through terminal J602.

Considering the first-mentioned output of pulse selector 607, the output signals from each of the pulse selector tubes V607A, V607B are applied through conductor 607a to the pedestal generator 619 as indicated in the Fig. 6 block diagram. The pedestal generator 619 is, in turn, connected to the grid of the cathode-ray tube V625 through cathode follower 620 and intensity limiter 635 when the switch shown is set to its normal "fast" position. The pedestal generator 619 is also connected to the fast-sweep generator 621 which forms the horizontal sweep deflection for tube V625 when the switch is set to "fast."

The pedestal generator 619, cathode follower 620 and fast-sweep generator circuits are detailed in Fig. 7D. The pedestal generator comprises the dual triode V619B, V619A connected as a monostable multivibrator. The multivibrator is triggered by pulses applied through lead 607a which carries the pulse selector output signals (Figs. 11L and 11(O)) and generates a square-topped wave in response to such signals. The input to the pedestal generator is indicated by waveform (p) in Fig. 11 while the output from the pedestal generator is shown in Figs. 11Q and 11R. These output pulses from the pedestal generator are applied to cathode follower tube V620 through conductor 619b and thence to the vertical deflection plate of cathode-ray tube V625 through conductor 620a. It will be noted therefore that the pedestal generator provides a first "A" sweep for displaying the received ship-station reference signal and a second "B"

sweep which may occur either at a 13,000- or 18,000-μs. delay period following the "A" sweep depending upon whether an "A" or "B" ground-station is concerned, for displaying the local ("A" or "B") ground-station signal.

The fast-sweep circuit 621 comprises the tubes V620A and V621 shown in Fig. 7D. The output (Fig. 11M) of the pedestal generator 619 (tube V619) is connected to the input grid of V620A as indicated in Fig. 7D. When such signal gates the fast-sweep circuit, a sawtooth wave is generated (Fig. 11S) having an amplitude linearly related to the length of the pedestal. Such deflection waveform is applied through lead 621a to the horizontal deflection plates of cathode-ray tube V625 through a paraphase amplifier comprising the tube V624 (Fig. 7C). The paraphase amplifier serves as a phase splitting device that converts the applied sawtooth voltage from either the fast or slow-sweep circuits into symmetrical push-pull sawtooth waves. The use of a push-pull phase-splitting amplifier in this manner obviates the need for high voltage on the plate of the amplifier. These sweeps accordingly display the ship-station any local ground-station signals provided by the ground-station receiver.

The slow-sweep generator 622 and amplifier 623 shown in Fig. 6 comprises the circuit including tubes V622 and V623 in Fig. 7D. These circuits merely supply a slow-speed sweep for adjustment and calibration of the ground-station instrument and are similar in construction to the corresponding sweep generators previously described in connection with the ship-station equipment.

The block diagram of Fig. 6 indicates a "left-right" switch S600 which symbolizes the multicircuit compound switch S105 included in the frequency generator circuit 601, the "A" delay multivibrator 611 and associated mixer 633 and the connections to the deflection plates of the indicator tube V625 as indicated in Fig. 7C. The purpose of the left-right switch is to shift the received pulses to a desired position on the traces. As indicated in Fig. 7, the switch has three positions, and is spring-returned to a center or neutral position. When the switch is set to a fast position, only that portion of the circuit connected to the frequency generator 601 through switch portion S105A is used. On the slow sweep, an additional connection is made between the "A" delay circuit 605 and divider stage 603a through switch portions S105B and S101F. In this manner, a small frequency change is provided on the fast sweeps and a greater frequency change is made available on the slow sweeps so that the pulses may be moved at a convenient speed during either slow or fast sweep settings.

A 10-μs. clock pulse controlled marker amplifier 616 is empolyed to provide marker pulses on the vertical sweep of the cathode-ray indicator tube V625. The 10-μs. amplifier 616 is detailed in Fig. 7A as comprising a double triode tube V616A, V616B, the input of which receives a 100-kc. clock pulse from the standard frequency generators 601. Section V616b of the 10-μs. marker amplifier comprises a cathode follower the output of which is applied through switch S104c to the vertical deflection plates of the cathode-ray tube V625.

The ground-station instrument also employs a 50- and 500-μs. marker mixer 604 and a trace shift mixer 613b indicated in the block diagram of Fig. 6. These elements are detailed in the circuit diagram of Fig. 7 as comprising the tube V604B (Fig. 7A) for the 50- and 500-μs. mixer and the tube V613B (Fig. 7A) comprising the trace shift mixer mechanism. The purpose of the 50- and 500-μs. marker mixer 604 is to mix the pulses obtained from the second and third stages of the divider 603b, 603c at intervals of 50 and 500-μs., and to supply them to the vertical deflection plates of the oscilloscope. The marker-mixer tube V604B (Fig. 7A) is coupled to the tracer shift mixer tube V613B and receives its input signals from the outputs of the first and second divider stages 603a and 603b, respectively as indicated in Fig. 7A. The trace shift mixer V613B is employed as a cathode follower and receives the output of the square-wave generator 615 through cathode follower 618 (Fig. 6) comprising tube V618 in Fig. 7B. Such square-wave pulse and the clock pulse are combined in the cathode circuits as indicated and are fed through conductor 613a to the vertical deflection plates on the display tube V625.

The visual indicator tube V625 is a conventional cathode-ray oscilloscope tube of the 5CP1 type. This scope is similar to the visual display tube employed in the previously described ship equipment, and is used to match the transmitted and received waves at the ground stage. As shown in Fig. 6, an intensity limiter 135 having a purpose and function similar to that of the corresponding device in the ship equipment is employed. The circuit of the intensity limiter is detailed in Fig. 7C as comprising the tube V635. When the fast sweep speed is used the intensity limiter circuits supplies a blanking pulse to the grid of the oscilloscope so that the beam is cut off except when the forward sweep is actually taking place. When the slow sweep speed is used the intensity limiter is not employed.

The remaining component of the ground-station controller-indicator instrument comprises a synchronizer 637 indicated in block form in the diagram of Fig. 6. The synchronizer comprises the circuitry involving tubes V637, V638, and V639 as detailed in Fig. 7D. The purpose of the synchronizer circuit is to keep the ground-station crystal oscillator 601 at the same frequency as the ship-station precision oscillator.

To accomplish this, a gating pulse obtained from the ground-station oscillator 601 is mixed with a signal representing the leading edge of the wavefront of the ship-station video signal pulse as obtained from the ground-station receiver (Fig. 5). Specifically, as is more clearly shown in the block diagram of Fig. 6, the received video signal is applied from the ground-station receiver to terminal J104 shown in the lower left-hand corner of Fig. 7A. Terminal J104 is connected to the cathode of tube V616B comprising part of the previously described 10-μs. marker amplifier 616. Since the tube V616B is also energized by the ground-station oscillator or standard frequency generator 601 as indicated in Fig. 7A, the desired mixing of the ship- and ground-station signals is obtained at such cathode, and applied through conductor 620a indicated in Figs. 7A, 7C, and 7D to tube V638 (Fig. 7D) of the synchronizer 637.

The mixer tube V638 also receives a signal from the synchronizer delay circuit 612 which, as shown in Fig. 7C consists of a multivibrator V612A, V612B. The synchronizer delay circuit is operated as a monostable multivibrator which is triggered by a signal from the negative end of the previously described "A" delay multivibrator 611. As previously described, the "A" delay multivibrator starts the sequence of events corresponding to display of the ship-station signal and the synchronizer delay 612 therefore injects a 10-μs. gate which is applied through lead 620c (Fig. 7C) to tube V637A (Fig. 7D) of the synchronizer 637. The purpose of such delay gate is to compensate for the delay time occasioned in the receiving process. Specifically, the output of the synchronizer delay multivibrator circuit V612A, V612B (Fig. 7C) is a positive pulse about 75 μs. long. The negative edge of the pulse is differentiated by capacitor C623 and the resistor R687 the latter being shown in the grid return circuit of tube V637A in Fig. 7D. When the signal is applied to the referred-to synchronizer tube V637A, the output comprises a positive pulse about 10 μs. long which is delayed approximately 75 μs. The control and screen grids of tube V638 is biased to approximately 30 volts negative and, accordingly, the applied signals must be sufficiently positive to cause conduction of the tube. In other words, tube V638 functions as a coincident gate. The referred-to 10-μs. signal from V637 is applied to the control grid of V638 while the previously described video and oscillator combined signals are applied to the screen grid. Mixing therefore takes place on the leading edge of the video pulse and a negative output pulse is obtained at the plate of V638.

The combined signal output of the mixer is rectified by tube V637B and the resulting D.C. voltage stored in the condenser C627. Such signal comprises the previously referred-to error signal voltage employed with the automatic frequency control circuit 636 already described. Should a frequency or phase change occur between the ship's transmitted clock signal and the clock signal generated at the ground-station oscillator, the gating signal moves with respect to the ship pulse, so that the mixing takes place in a different portion of the wavefront. A consequent change is produced at the output of the mixer tube V638 and thereby varies the error voltage. The direction of such voltage change is such as to make the AFC circuit correct the ground-station oscillator frequency. Since the error voltage can either be plus or minus with respect to the normal, or no error voltage, the AFC circuit can correct for a plus or minus change in relative frequency between the two oscillators. Condenser C627 is charged by such negative pulse through the diode comprising tube V637B. This negative voltage is then applied to the grid of the automatic frequency control tube V636A (Fig. 7A). The same signal appears at the grid of the differential amplifier tube V639A (Fig. 7D). Should the video pulse change its time position with respect to the gating pulse there will therefore be a change in mixer output which will change the value of the potential on the capacitor C627. The differential amplifier will then be unbalanced and will register an indication on the signal meter 640 shown in Fig. 7D. Also the change in the capacitor C627 voltage will cause the automatic frequency control tube V636A to operate and the 100-kc. oscillator 621 to alter frequency in the direction to correct for the change in the position of the video signal with respect to the mixer gate.

The delay period provided by the synchronizer delay multivibrator (tube V612), may be varied by the synchronizer delay controls R638, R639, R637. These controls are symbolized in Fig. 7 and in the block diagram of Fig. 6 by the control knob 612a. This control may be adjusted so that the leading edge of the received ship-station video signal may be made to match the leading edge of the ground-station video signal. When the ground station is in synchronism, the synchronizing meter 640 will be centered if the ground station 100-kc. oscillator has the same frequency as the ship-station oscillator. If there is a frequency difference it may be corrected by the fine frequency control associated with the oscillator 601 which is used to center the needle on the signal meter 640.

*Ground-station instrument—summary.*—The purpose of each "A" and "B" ground-station instrument is to receive an inquiry signal transmitted from the remote mobile or ship station and transmit a responding signal after a predetermined delay period identified with each respective ground station. It will be remembered from the description of the ship-station instrument, that the ground-station signals when received there, are sequentially displayed in alternate time sequence at a repetition rate of 41⅔ times a second and that adjustable range units at the ship station are associated with each display circuit and can control the phase between the local ship reference and received ground-station signals until their wavefronts are matched.

At the ground-station instrument, the square-wave generator 615 supplies 12,000 $\mu$s. apart timing pulses to "A" and "B" delay circuits 611, 614, respectively. The "B" delay circuit is therefore initiated 12,000 $\mu$s. after the "A" delay circuit. Each delay unit provides a delay function in characteristic multivibrator fashion, that is, by generating a square-wave pulse, the length of which corresponds to the desired delay period and the trailing edge of which determines the exact length of the delay period. Thus the "A" delay multivibrator 611 which ultimately determines the display for the received ship-station signal, is designed to provide a 1000-$\mu$s. delay period regardless of whether it is located in an "A" or "B" ground-station instrument, while the "B" delay multivibrator which ultimately determines the display of either an "A" or "B" ground-station signal is designed to provide a 2000-$\mu$s. delay period when forming part of an "A" ground-station instrument and a 7000-$\mu$s. delay period when located in a "B" ground-station unit.

The output of each delay circuit is then mixed with a 50-$\mu$s. marker pulse in corresponding mixer circuits 633 and 634, respectively. The output of each mixer comprises a 75-$\mu$s. pedestal carrying a 50-$\mu$s. marker, the output of the "B" mixer 634 occurring either 13,000 $\mu$s. or 18,000 $\mu$s. after the "A" mixer output depending upon whether an "A" or "B" ground station is concerned. In this manner precisely time-spaced 50-$\mu$s. control pulses are generated and made available for the purposes now to be described. The 50-$\mu$s. control pulses are applied to two-section pulse selectors 607. The pulse selectors provide the following outputs: (1) the 50-$\mu$s. output control pulse from the "B" section (V607B, Fig. 7) is applied through conductor 607b to the ground-station transmitter trigger V636B, V617 which triggers the ground-station transmitter (Fig. 4A) at either a 13,000-$\mu$s. or 18,000-$\mu$s. delay period depending upon whether an "A" or "B" ground station is concerned, (2) a combined output from both the "A" and "B" sections (V607A, V607B) of the pulse selector which, through lead 607a accomplishes the following results:

(a) When a 50-$\mu$s. control pulse from V607A is manifested, the pedestal generator 619 is triggered to provide a sweep for displaying the remote, mobile station signal;

(b) When a 50-$\mu$s. control pulse from V607B is manifested, the pedestal generator 619 is triggered to display either the "A" or "B" ground-station signal after either a 13,000 or 18,000-$\mu$s. delay period depending on whether an "A" or "B" ground station is concerned.

The manner in which the different delay periods provided in each of the "A" and "B" ground-station instruments respectively are effective in preventing ambiguity in identifying the ground stations at the ship-station instrument has been described. Such delay periods however must be effectively cancelled in the ship-station instrument in order that the "A" and "B" ground station responding signals can be displayed concurrently with the local ship-station signal in the described manner. The ship-station instrument provides for such cancellation in a manner that can be explained by the time scales symbolically portrayed in Fig. 12.

For the purpose of explaining the manner in which the different delay periods are compensated it will be assumed that there is zero distance between the ship and each of the ground stations so that a transmitted ship-station signal ($T_s$) will be instantaneously received at both the "A" and "B" ground stations as a signal ($R_s$). Figure 12A is a representative time scale drawn for the ship station while Figs. 12B and 12C are time scale representations for the "A" and "B" ground stations respectively.

Considering zero time as the beginning of each 12,000 $\mu$s. half period, the transmitted ship-station signal $T_s$ indicated in Fig. 12A occurs after an interval of 2000 $\mu$s. as indicated by the timing diagram of Fig. 10A previously discussed. (The number 2000 is employed in the immediate discussion instead of the actual 2010 $\mu$s. interval indicated in Fig. 10A for purposes of convenience. In a similar manner, the figure 1000 will be employed in lieu of 1050 $\mu$s. interval indicated in the timing diagram of Fig. 11.) Since a zero distance is assumed, the transmitted ship-station signal $T_s$ will be instantaneously received at each of the ground stations simultaneously and the received signal is therefore indicated as $R_s$ in the "A" and "B" time scales shown in Figs. 12B and 12C respectively.

Since the "B" delay multivibrator when located in an "A" ground-station unit as described delays the "A" ground station responding signal by a 13,000-μs. interval, the "A" ground-station transmitted or responding signal labeled as $T_a$ in Fig. 12B will be transmitted a 13,000-μs. interval following $R_s$ as indicated in such figure and will be immediately received at the ship station as indicated by $R_a$ in Fig. 12A. Similarly the described 18,000-μs. delay interval provided in the "B" ground-station instrument will cause the "B" ground station to transmit its responding signal indicated by $T_b$ in Fig. 12C 18,000-μs. after the received ship-station signal $R_s$. Such signal likewise will be immediately received at the ship station as is indicated by $R_b$ in Fig. 12A.

As indicated in the ground-station timing diagram of Fig. 11K each of the ground-station signals are initiated at a 1000-μs. interval (actually 1050-μs.) after the beginning of a 12,000-μs. half period. In connection with the ground stations zero corresponds to the beginning of a 12,000-μs. timing interval. For convenience in explanation, the zero time for each of the "A" and "B" ground-station time scales (Figs. 12A and 12B) are shown displaced to the right of the ship-station time scale (Fig. 12A) by 1000-μs. It will therefore be apparent from Fig. 12 that the "A" ground-station transmitted signal $T_a$ will occur 2000-μs. after the start of a 12,000-μs. half period (i.e. 13,000 plus 1000 minus 12,000) as indicated in Fig. 12B while the "B" ground-station transmitted signal $T_b$ will occur 7000-μs. after the beginning of a 12,000-μs. half period (i.e. 18,000 plus 1000 minus 12,000) as indicated in Fig. 12C. Therefore, the corresponding signals $R_a$ and $R_b$ will be received at the ship station at periods of 3,000 (i.e. 13,000 plus 2000 minus 12,000) and 8000-μs. (i.e. 18,000 plus 2000 minus 12,000) respectively after the start of a 12,000-μs. delay period measured at the ship station as indicated in the Fig. 12A time scale. Since, as previously described, the ship-station instrument indicator unit provides corresponding delayed display sweeps of 3000 and 8000-μs. respectively, it will be apparent that despite the delay periods of response in each ground station, the ship-station instrument will display the ground-station signals in proper correlation with the local ship-station signal.

Accordingly, a single frequency, multiple station ranging system is provided in accordance with the principles of this invention in which there is no conflict between the respective signals provided by the multiple ground stations in response to the inquiry signal from the mobile station.

Synchronism between the ship-station and ground-station instruments is obtained at each "A" and "B" ground station by the described synchronizing system comprising the AFC unit 636 synchronizer 637 and the synchronizer delay control 612. By manipulating the adjustable control 612a the wavefronts of the received ship-station signal and the local ground-station signal are matched and such synchronization precisely sets the time at which the ground-station local signal will be transmitted in respect to the time of receipt of the ship-station signal. In other words, when synchronization between the referred-to wavefronts is obtained, the ground station will be transmitting at a predetermined time after receiving the ship-station signal.

It will be apparent that the embodiments shown are only exemplary and that various modifications can be made in construction and arrangement within the scope of invention as defined in the appended claims.

What is claimed is:

1. A radio navigation system comprising a first mobile station and at least two fixed stations geometrically positioned with respect to the mobile station comprising, means in the mobile station for simultaneously transmitting a reference signal of a specified frequency to each of said fixed stations, means in each of said fixed stations responsive to said reference signal for transmitting a responding signal at said same frequency a predetermined delay interval following receipt of said reference signal, said predetermined delay time being different for each respective fixed station, said means in each of said fixed stations comprising adjustable means for synchronizing said mobile station reference signal with said fixed station responding signal and signal delay means articulated with said adjustable means for energizing said responding signal transmitting means after a delay period corresponding to said predetermined delay period characterizing each respective ground station, means at the mobile station for receiving each of said fixed-station responding signals including means for sequentially displaying said received signals at alternate time periods relative to said mobile station reference signal, said displaying means comprising means for adjustably varying the time at which each of said received fixed-station responding signals is displayed in relation to the time of display of said mobile-station reference signal by an amount corresponding to each of said predetermined delay intervals respectively for matching the wavefronts of each of said fixed station signals respectively with said reference signal, and means on said adjustably varying means for manifesting range.

2. The invention of claim 1 in which the means for sequentially displaying the fixed-station signals at the mobile station includes means for delaying the presentation of each of said received fixed-station responding signals for a period corresponding to the difference between said delay periods characterizing each of said fixed stations respectively.

3. The invention of claim 1 including means in said mobile-station signal displaying means for generating a mobile-station reference signal, and in which said means for providing a predetermined delay period in each of said fixed stations comprises a clock pulse source, a first delay means responsive to said source for generating a mobile-station identification control pulse, a second delay means responsive to said clock pulse source for generating a fixed-station responding signal a predetermined time interval following generation of said identification signal, said delay interval being different for each fixed station, means in each of said fixed stations for synchronizing said mobile-station identification pulse and fixed-station signal generating means with said received mobile station reference signal, adjustable means in said fixed stations for synchronizing said identification pulse and fixed-station responding signal and means for transmitting said fixed-station responding signal to said mobile station.

4. In a radio navigation system comprising a mobile station and at least two remote fixed stations each of said fixed stations having means for receiving signals transmitted by said mobile station and transmitting responding signals at a respective frequency corresponding to said mobile station transmitted signals, said mobile station comprising a clock pulse source, first and second means for phase controlling pulses from said source to provide first and second groups of adjustable-according-to-time fixed-station signal identifying control pulses, each pulse group corresponding to each of said fixed stations respectively, first delay means in said mobile station responsive to said first phase control means and to said clock pulse source for determining the time position of said first pulse group, second delay means in said mobile station responsive to said second phase control means in said mobile station and to said clock pulse source for determining the time position of said second pulse group, third delay means in said mobile station responsive to said clock pulse source for defining an invariable reference pulse and means responsive to said first adjustable group of control pulses for identifying said responding signals received from a first of said fixed stations, means in said mobile station responsive to said second adjustable control pulse group for identifying said responding signals received from said second fixed station and means in said mobile station responsive to said reference pulse for identifying said mobile station signal concurrently with each of said first and second identified signals respectively.

5. The invention of claim 4 in which each of the fixed-station signals are time delayed with respect to the mobile station identification signal by different time intervals, the said first and second delay means in the mobile station providing delay periods corresponding to each such delay interval respectively.

6. The invention of claim 5 including means for displaying said signals in said mobile station comprising means for separately registering said first and second received fixed-station signals, commutating means responsive to said clock pulse source for sequentially energizing each registering means in alternate time sequence and signal receiving means responsive to said clock pulse source for applying the received fixed-station signals to said commutating means.

7. The invention of claim 6 in which said mobile station registering means comprises a cathode-ray tube having a first sweep circuit and a second signal deflection circuit for displacing the cathode beam, means for applying said first and second control pulse groups and said reference pulse control to said sweep circuit and means connecting said signal commutating means to said deflection circuit.

8. The invention of claim 7 in which said second signal deflecting circuit comprises separately energizable means, and said commutating means comprises a first signal gating means corresponding to one of said fixed stations connected to one of said energizable means, a second signal gating means corresponding to a second of said fixed stations operatively connected to another of said energizable means, means connecting the mobile-station receiver to each of said signal gating means, and a clock-controlled source of commutating signals having a plurality of outputs of opposite polarity, said outputs being connected respectively to said first and second signal gating means.

9. The invention of claim 8 in which said source of commutating signals comprises a bistable multivibrator having a signal differentiating circuit in each output circuit.

10. The invention of claim 9 in which an output from said first and second delay means is connected to said first and second signal gating means respectively.

11. In a radio navigation system comprising a mobile station and at least two remote fixed stations each station having means for receiving and transmitting signals on a common frequency, said mobile station comprising, a clock pulse source defining a specified cycle period, first and second means for phase controlling pulses from said source to provide first and second groups of adjustable-according-to-time fixed-station signal identifying control pulses, each pulse group corresponding to each of said fixed-stations respectively, first and second delay multivibrators for providing respective delay periods for said first and second pulse groups, and a third delay multivibrator, means connecting said clock pulse source to said first and second delay multivibrators for simultaneously energizing them at a specified time in said cycle period, means connecting said clock pulse source to said third multivibrator for energizing the latter at a different time within said cycle period, a source of clock-controlled marker pulses connected to each of said multivibrators for terminating each multivibrator at a different time period following its energization to define different delay periods, a first signal combining means connected to said first phase controlling means and to said first multivibrator for identifying said first pulse group at a first delay time interval occurring within said cycle, a second signal combining means connected to said second phase controlling means and to said second multivibrator for identifying said second pulse group at a second delay time interval occurring within said cycle period, third signal combining means connected to said clock pulse source and to said third delay multivibrator for identifying a reference pulse occurring periodically with respect to said first and second pulse groups and within said cycle period, and display means connected to each of said signal combining means.

12. The invention of calim 11 including means responsive to said third signal combining means for triggering said mobile-station transmitting means.

13. In a radio navigation system comprising a mobile station and at least two remote fixed stations, each of said fixed stations having means for receiving signals transmitted by said mobile station and transmitting responding signals at a respective frequency corresponding to said mobile station frequency, each of said fixed stations comprising a receiver responsive to said mobile station transmitted signal, a stabilized clock pulse source, separately energizable means for identifying said received mobile-station signal and said local fixed-station transmitted signal, means responsive to said clock-pulse source for generating a first control pulse for energizing said identifying means, means responsive to said clock-pulse source for generating a second control pulse to energize said identifying means at a delayed time period with respect to said first control pulse, said delay period being different for each of said fixed stations and for concurrently energizing said fixed-station transmitting means, means for applying said received mobile-station and local transmitted signal to said energizable means, and frequency-stabilizing means responsive to said last means and to said clock-pulse source for synchronizing the frequency of said clock-pulse source to that of said mobile station.

14. The invention of claim 13 in which said signal identifying means comprises a cathode-ray tube having a sweep circuit sequentially energizable by said control pulses and means for manifesting said applied mobile-station and local-station signals.

15. The invention of claim 13 in which the means for generating said first and second control pulses comprises means responsive to said clock-pulse source for generating separate timing signals of opposite phase, and first and second delay circuits for converting said timing signals to corresponding control pulses each having a different delayed time of occurrence.

16. The invention of claim 15 in which each of said delay circuits comprises a multivibrator energizable by said clock-pulse source, clock-pulse responsive means for terminating the duration of energization of said multivibrator to define a respective delay period.

17. The invention of claim 16 in which said frequency stabilizing means, comprises phase sensitive means for comparing the mobile-station and local-station signals, means responsive to said phase sensitive means and to one of said delay multivibrators for generating an error signal, and frequency control means responsive to said error signal connected to said clock pulse source.

18. The invention of claim 17 in which said error signal generating means comprises a time delay multivibrator having an adjustable time-constant selecting means.

References Cited in the file of this patent

UNITED STATES PATENTS

| 2,441,956 | Deloraine | May 25, 1948 |

OTHER REFERENCES

| 587,351 | Great Britain | Apr. 23, 1947 |
| 1,013,603 | France | Apr. 30, 1952 |